US010203460B2

(12) United States Patent
Furuyama et al.

(10) Patent No.: US 10,203,460 B2
(45) Date of Patent: Feb. 12, 2019

(54) OPTICAL SEMICONDUCTOR MODULE

(71) Applicant: KABUSHIKI KAISHA TOSHIBA, Tokyo (JP)

(72) Inventors: Hideto Furuyama, Kanagawa (JP); Yoichiro Kurita, Tokyo (JP); Hiroshi Uemura, Kanagawa (JP); Fumitaka Ishibashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 15/688,717

(22) Filed: Aug. 28, 2017

(65) Prior Publication Data

US 2018/0128998 A1    May 10, 2018

(30) Foreign Application Priority Data

Nov. 7, 2016 (JP) .................... 2016-217420

(51) Int. Cl.
*G02B 6/42* (2006.01)
*G02B 6/32* (2006.01)
*G02B 6/34* (2006.01)

(52) U.S. Cl.
CPC ............ *G02B 6/424* (2013.01); *G02B 6/32* (2013.01); *G02B 6/34* (2013.01); *G02B 6/4251* (2013.01); *G02B 6/4256* (2013.01); *G02B 6/4274* (2013.01)

(58) Field of Classification Search
CPC . G02B 6/424; G02B 6/32; G02B 6/34; G02B 6/4251; G02B 6/4256; G02B 6/4274

USPC ............................................. 385/88
See application file for complete search history.

(56) References Cited

U.S. PATENT DOCUMENTS

| 7,153,361 | B2 | 12/2006 | Furuyama |
| 9,465,164 | B2 | 10/2016 | Sasaki et al. |
| 2002/0181853 | A1* | 12/2002 | Ido .................. G02B 6/421 385/19 |
| 2004/0240773 | A1* | 12/2004 | Kobinata ............ H01L 31/12 385/14 |
| 2008/0123198 | A1* | 5/2008 | Fujita ................ G02B 6/4206 359/709 |
| 2008/0285910 | A1* | 11/2008 | Yamada ............ G02B 6/12002 385/14 |
| 2013/0330049 | A1* | 12/2013 | Yanagisawa ......... G02B 6/42 385/88 |

(Continued)

FOREIGN PATENT DOCUMENTS

| JP | 3723177 B2 | 12/2005 |
| JP | 3831350 B2 | 10/2006 |

(Continued)

*Primary Examiner* — Jerry Blevins
(74) *Attorney, Agent, or Firm* — Kim & Stewart LLP

(57) ABSTRACT

An optical semiconductor module includes a resin body having a first surface and an opposed second surface, an optical device having a third surface and a fourth surface opposite the third surface, the optical device comprising an optical element located at the fourth surface, the optical element capable of at least one of receiving light from, and transmitting light through, the third surface, a first terminal located at the first surface of the resin body, and an electrical connection between the first terminal and the optical device, the electrical connection embedded in the resin body.

26 Claims, 19 Drawing Sheets

(56) References Cited

U.S. PATENT DOCUMENTS

2016/0276806 A1  9/2016  Ohira et al.
2017/0153401 A1  6/2017  Kurita et al.

FOREIGN PATENT DOCUMENTS

JP      3884155 B2    2/2007
JP    2014203945 A   10/2014

* cited by examiner

OPTICAL SEMICONDUCTOR MODULE

CROSS-REFERENCE TO RELATED APPLICATION

This application is based upon and claims the benefit of priority from Japanese Patent Application No. 2016-217420, filed Nov. 7, 2016, the entire contents of which are incorporated herein by reference.

FIELD

Embodiments described herein relate generally to an optical semiconductor module.

BACKGROUND

An optical device that optically couples an optical fiber and an optical element (e.g., a light-emitting element or a light-receiving element), and an optical transmission technology such as optical communication and optical wiring have been studied.

DETAILED DESCRIPTION

Figure 1:
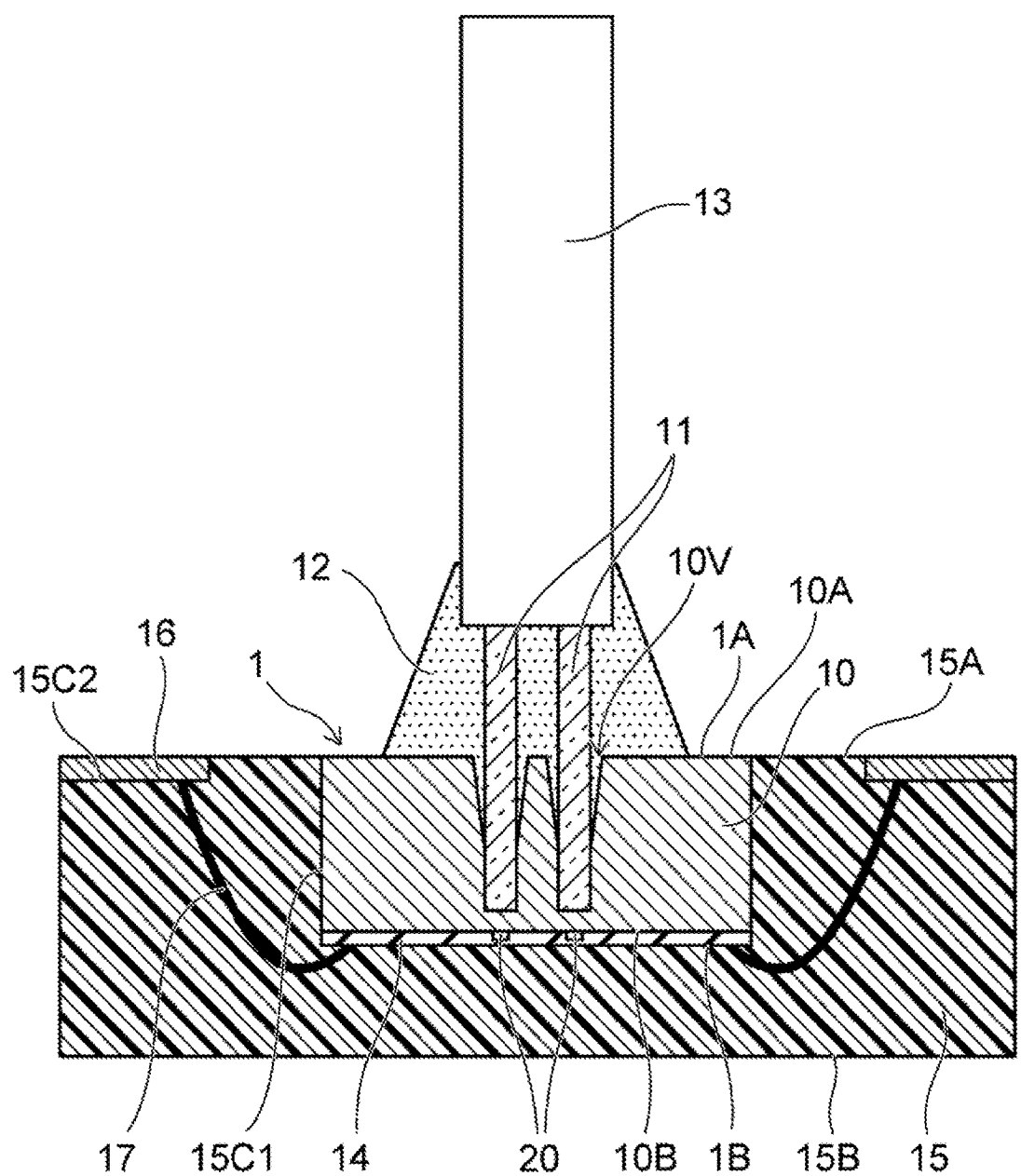
FIG. 1 is a schematic cross-sectional view of an optical semiconductor module according to a first embodiment.

In general, according to one embodiment, an optical semiconductor module includes a resin body having a first surface and an opposed second surface, an optical device having a third surface and a fourth surface opposite the third surface, the optical device comprising an optical element located at the fourth surface, the optical element capable of at least one of receiving light from, and transmitting light through, the third surface, a first terminal located at the first surface of the resin body, and an electrical connection between the first terminal and the optical device, the electrical connection embedded in the resin body.

Hereinafter, embodiments will be described with reference to the drawings. In each drawing, the same reference signs will be given to the same elements. All of the drawings are schematic diagrams. For example, in order to make the features of the drawing figures easy to see, in some drawings, some of the configuration elements are omitted or the number of configuration elements is reduced. In the drawings, the number of configuration elements and their dimensional ratios are not always consistent.

First Embodiment

An optical semiconductor module according to a first embodiment and a method of manufacturing the same will be described. FIG. 1 is a schematic cross-sectional view of the optical semiconductor module according to the first embodiment. As illustrated in FIG. 1, an optical device 1 having a first surface 1A and a second surface 1B at the opposite side from the first surface 1A is provided. The optical device 1 has a single or a plurality of optical elements 20 (e.g., light-emitting element, light-receiving element, diffraction grating, or the like) on a semiconductor substrate, for example, on a silicon substrate 10. Light can be input and output through the first surface 1A side, and the optical element 20 is formed at the second surface 1B side.

In the present embodiment, for example, a blind via, also referred to as a fiber socket, 10V is provided at the first surface side. The blind via 10V is formed so as to be aligned with a place where light of the optical element 20 passes, for example, a light-emitting portion or a light-receiving portion in a case where the optical element is a light-emitting element or a light-receiving element respectively. In this way, the light can be input and output through the first surface side via the blind via 10V. Here, the optical element 20 is not limited to an element for converting an electric signal into an optical signal or converting an optical signal to an electric signal such as a light-emitting element or a light-receiving element, and includes an element for changing the traveling direction of light or an element that reflects the light. In the description of the blind via 10V of the optical device 1, the number of blind vias is two, but the number of blind vias 10V may be one or may be three or more.

As illustrated in FIG. 1, a blind via 10V is formed in the silicon substrate 10. This blind via 10V is formed to an intermediate portion of the silicon substrate 10 in the thickness direction and does not pass through the silicon substrate 10. That is, if it is assumed that the silicon substrate 10 includes a first surface 10A which is a light input/output side and a second surface 10B which is at the opposite side to the first surface and on which an optical element is provided, the blind via 10V is formed to the intermediate portion of the silicon substrate 10 in the thickness direction from the first surface 10A side, and does not reach the second surface 10B. A distance between a bottom surface of the blind via 10V and the second surface 10B is, for example, 20 μm to 40 μm.

The optical element (e.g., a light-emitting element or light-receiving element) 20 is formed on the second surface 10B of the silicon substrate 10, the blind via 10V is formed so as to be aligned with the light-emitting portion or the light-receiving portion of the optical element 20. That is, the blind via 10V is disposed such that the light-emitting portion or the light-receiving portion of the optical element 20 is located on the optical axis of the optical fiber 11, such that the optical element 20 and the optical fiber 11 described later can be optically coupled.

The optical fiber 11 is inserted into the blind via 10V of the optical device 1, and the optical fiber 11 is fixed to the silicon substrate 10 by a transparent resin 12 or the like. A cover 13 that covers the optical fiber 11 is provided on the optical fiber 11.

Materials and structures that operate at wavelengths where the semiconductor substrate becomes transparent are used for the optical element 20. For example, in a case where a semiconductor substrate is the silicon substrate 10, a light-emitting element is configured using materials such as GaInAsP type or AlInGaAs type material that is lattice-matched to the InP substrate such that an emission wavelength of the light-emitting element becomes, for example, longer than 1.3 μm. The light-receiving element is formed using a material that can receive the emission wavelength of the light-emitting element, for example, InGaAs that is lattice-matched to the InP substrate is configured on an InP substrate as a light absorption layer.

The optical element 20 can be manufactured using an existing method, and it is desirable to form the optical element 20 in a state where the flatness of the silicon substrate 10 is maintained, and it is desirable to be formed before forming the blind via 10V. However, the optical element 20 may be formed after forming the blind via 10V, and may be formed any time as long as the light-emitting portion or the light-receiving portion of the optical element 20 is aligned so as to be optically coupled to the optical fiber 11.

The optical element 20 is configured with a compound semiconductor, for example, III-V semiconductor, material, and includes a crystal growth layer in which a compound semiconductor material is crystal-grown on a compound semiconductor substrate different from the silicon substrate (i.e., semiconductor substrate) 10, and this compound semiconductor material may be bonded to the second surface 10B of the silicon substrate 10 to form an optical element active portion.

The optical element 20 may be provided directly on the second surface 10B of the silicon substrate 10. Here, "directly provided" includes a case where, for example, another compound semiconductor material is directly attached to the second surface 10B of the silicon substrate 10 without being mounted by a bump or the like, or a case where the optical element 20 is integrated on the second surface of the silicon substrate 10 by crystal growth.

Furthermore, as a form of the optical element 20 being directly provided on the second surface 10B of the silicon substrate 10, a part of the functional configuration of the optical element 20 may be provided on the silicon substrate 10. For example, in a case where the optical element 20 is a surface-emitting type semiconductor laser and a pair of reflecting mirrors that configure the laser resonator is provided vertically across the light emitting layer, and one of the reflecting mirrors is formed to be embedded in the surface or inside of the silicon substrate 10, then, "directly provided" may include a case where another compound semiconductor material containing a light-emitting layer and a reflector at the opposite side to the second surface of the silicon substrate 10 are bonded to be integrated.

In addition, the light-emitting portion or the light-receiving portion provided as the optical element 20 may not be disposed directly on the optical axis of the optical fiber 11, and the light may be guided by an optical waveguide or the like to the light-receiving portion of the light-emitting element or the light-emitting portion of the light-receiving element disposed at another position on the second surface 10B of the silicon substrate 10 by providing an optical coupling structure such as a diffraction grating as an optical element on the extension of the optical axis of the optical fiber 11 on the second surface 10B of the silicon substrate 10.

An inner wall of the blind via 10V may have a vertical shape formed perpendicular to the first surface 10A, and as illustrated in FIG. 1, may have a tapered shape in which a hole diameter gradually decreases from the first surface 10A toward the depth direction of the blind via, and furthermore, may have a combined shape of the vertical shape and the tapered shape.

In addition, an insulating layer 14 including, for example, a resin or the like is provided on the second surface 10B of the silicon substrate 10 on which the optical element 20 is provided. A wiring electrode, simply referred to as "electrode" hereinafter, electrically connected to an electrode of the light-emitting element or the light-receiving element is provided on the insulating layer 14.

The optical semiconductor module having the configuration illustrated in FIG. 1 performs an operation described below. Light emitted from the optical element 20 passes through the silicon substrate 10 between the optical element 20 and the bottom surface of the blind via 10V, and is incident on the end portion of the optical fiber 11. The light that is incident on the end portion of the optical fiber 11 propagates through the optical fiber 11 and is incident on the light-receiving element (not illustrated) disposed at the other end portion of the optical fiber 11.

In addition, light emitted from the optical fiber 11 passes through the silicon substrate 10 between the bottom surface of the blind via 10V and the optical element 20, and is incident on the optical element 20. The light that is incident on the optical element 20 is photoelectrically converted by the optical element 20 and becomes an electric signal.

In the present embodiment, silicon is used as a semiconductor substrate, but a semiconductor substrate other than the silicon may be used. The structure of the optical device 1 is not limited to that described above, and any structure may be used as long as light can be input and output through the first surface 1A side and an optical element may be formed on the second surface 1B side. By configuring in this manner, it is possible to realize an optical semiconductor module in which the optical element 20 is optically coupled to the optical fiber 11 and the optical device 1 can support the optical fiber 11 without an additional support.

As illustrated in FIG. 1, a resin 15 has a first surface 15A and a second surface 15B at the opposite side to the first surface, and the optical device 1 is embedded in the first surface 15A side of the resin 15. The optical device 1 is provided on the resin 15 such that at least the first surface 1A of the optical device 1 is exposed from the resin 15. A first recess portion 15C1 is provided in the first surface 15A of the resin 15 as a part of the first surface 15A, and the optical device 1 is provided in the first recess portion 15C1 such that the first surface 1A of the optical device is exposed. The optical device 1 is provided such that, for example, the second surface 1B and the side surface thereof are covered with the resin 15.

The first surface 1A of the optical device 1 and the first surface 15A of the resin 15 are adjacently provided to be in substantially the same plane with each other. Here, substantially the same plane includes a case where there are microscopic steps and irregularities within 20 μm, preferably within 5 μm without considering microscopic irregularities on the surface electrode or a deviation occurring in the manufacturing process. The deviation occurring in the manufacturing process means, for example, a deviation of an embedded height of the optical device 1 caused by pushing the optical device into the adhesive layer due to the thickness and elasticity of the adhesive layer of a tape when providing the optical device on the adhesive tape described below.

It is preferable to use, for example, the epoxy resin or the silicone resin containing a silica filler such that a coefficient of thermal expansion matches the semiconductor material as the resin 15, and it is preferable to use a resin for wafer level package that can control wafer warpage by adjusting the elastic modulus of the resin 15.

In addition, an electrode lead 16 used as an electric terminal is embedded in the first surface 15A side of the resin 15. The electrode lead 16 is provided on the resin 15 such that at least a part of surface thereof is exposed from the resin 15. As illustrated in FIG. 1, a second recess portion 15C2 is provided in the first surface 15A of the resin 15 as a part of the first surface 15A such that the upper surface and the side surface of the electrode lead 16 are exposed in the second recess portion 15C2. The electrode lead 16 is provided such that, for example, a part of the bottom surface and the side surface are covered by the resin 15. Here, the upper surface of the electrode lead 16 and the first surface 15A of the resin 15 are in substantially the same plane similarly to that of the optical device.

The second recess portion 15C2 does not have a trench shape in which a recess shape is provided between a plurality of protruding shapes, but has a processed structure in which a recess shape is provided adjacent to the protruding shape. In this case, it is also referred to as a recess portion.

The electrode lead 16 is a part of a lead frame and is a metal piece separated from the lead frame when the lead frame is separated into individual pieces. The lead frame is a frame having, for example, a constant arrangement pitch. The lead frame including the electrode lead 16 is prepared by, for example, applying photolithography and etching on one copper plate, for example, of a thickness of 150 μm, and the electric terminals for a plurality of modules are integrated by a support frame. Therefore, the electric terminals for all the modules can be handled collectively. As the material for the lead frame, for example, oxygen free copper, copper alloy (CuAg, CuZn, CuSnP, CuFeP, or the like), iron alloy (FeNi, or the like), and the like can be used. To prevent corrosion and oxidation, a plating treatment with Sn, Ni, Au/Ni, or the like may be applied to the surface of the lead frame. The plating layer formed by the plating treatment may be formed on the entire surface of the lead frame in advance, or may be selectively formed only on the exposed portion thereof after forming the resin or the electric terminal thereon.

The electrode provided on the insulating layer 14 of the optical device 1 is connected to the electrode lead 16 via a wire 17 such as a bonding wire provided as a connection portion. Materials such as gold, aluminum, copper, silver, or the like can be used as a material for the wire. Here, the wire is a wiring that is relatively thin and easy to bend, and has a curved shape, and can electrically connect electrodes having different heights by bonding thereto or the like without being in contact with the lower layer.

As described above, the resin 15 supports the optical device 1 and the electrode lead 16 which are provided separately from each other. In addition, the optical device 1 and the electrode lead 16 are embedded in the same surface side of the resin 15. Furthermore, a connection portion for electrically connecting the electrode of the optical device 1 and the electrode lead 16 to each other is provided in the resin 15.

In this way, the optical semiconductor module is configured by covering a part of the optical device and the electric terminal with a resin. The optical device and the part of the electric terminal are continuously covered by the resin and are integrated. In the present embodiment, the optical device and the part of the electric terminal are continuously covered by a single resin.

Next, FIGS. 2A to 2E are schematic cross-sectional views illustrating a process of a method of manufacturing the optical semiconductor module according to the first embodiment. The method of manufacturing according to the first embodiment will be described with reference to FIGS. 2A to 2E.

Figure 2A:
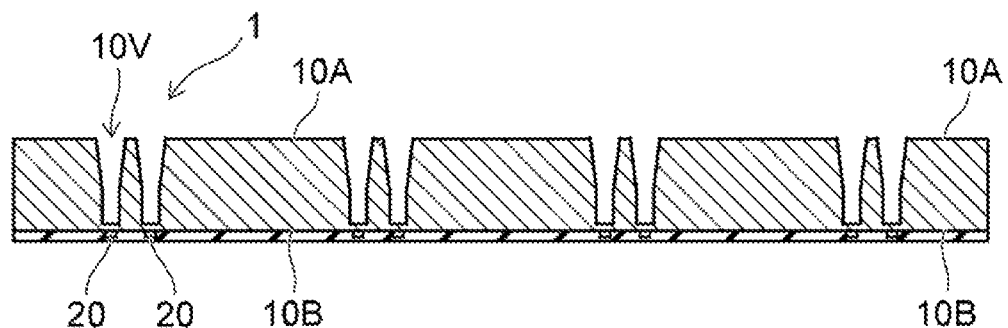
FIGS. 2A, 2B, 2C, 2D, and 2E are schematic cross-sectional views illustrating a process of a method of manufacturing the optical semiconductor module according to the first embodiment.

As illustrated in FIG. 2A, the blind via 10V is provided in the silicon substrate 10 which becomes the optical device 1. This blind via 10V is formed to the intermediate portion of the silicon substrate 10 in the thickness direction and does not pass through the silicon substrate 10.

The optical element (e.g., a light-emitting element or a light-receiving element) 20 is formed on the second surface 10B of the silicon substrate 10, and the blind via 10V is formed so as to be aligned with the light-emitting portion or the light-receiving portion of the optical element 20. That is, the blind via 10V is disposed such that the light-emitting portion or the light-receiving portion of the optical element 20 is located on the optical axis of the optical fiber 11, such that the optical element 20 and the optical fiber 11 provided later can be optically coupled.

In addition, the insulating layer 14 including, for example, a resin or the like is provided on the second surface 10B of the silicon substrate 10 on which the optical element 20 is provided. The wiring electrode, simply referred to as "electrode," that is electrically connected to the electrode of the light-emitting element or the light-receiving element is provided on the insulating layer 14 (FIG. 1). The light can be input and output through the first surface 1A side of the optical device 1, and the optical element 20 is formed on the second surface 1B side of the optical device 1.

Figure 2B:
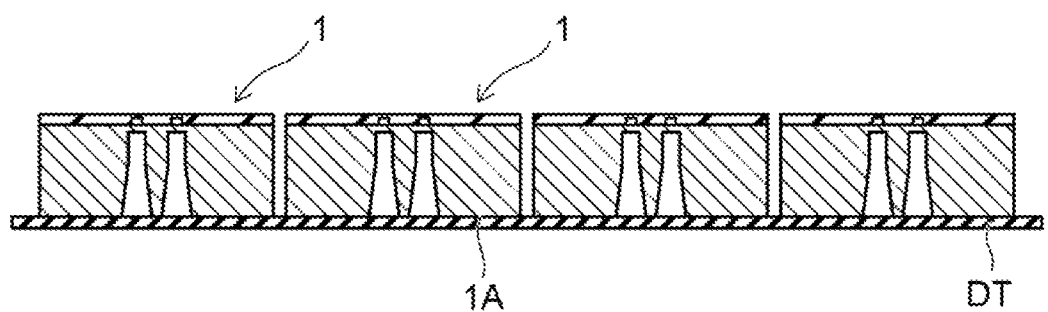

As illustrated in FIG. 2B, the optical device 1 is placed on a dicing tape DT which is a single-sided adhesive tape and is excellent in chip holding and tape extendability such that the first surface 1A of the optical device 1 faces the dicing tape DT. Subsequently, the optical device 1 is separated into individual pieces on the dicing tape DT. The extendibility of the dicing tape is excellent such that the optical device which is easily separated into individual pieces can be handled by extending the tape.

Figure 2C:
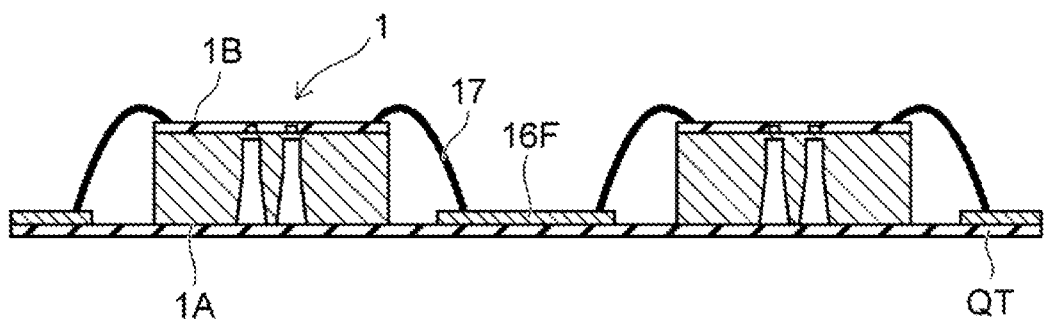

As illustrated in FIG. 2C, a lead frame 16F which will be separated into the electrode leads 16 and the optical device 1 are placed on a quad flat non-leaded package (QFN) tape QT which is a single-sided adhesive tape and of which the wire bondability to a mounting object and heat resistance during resin molding are excellent. The lead frames 16F for a plurality of modules are provided, and the optical element 20 is disposed at a predetermined position so as to be aligned with the positions of the lead frames 16F. That is, the optical device 1 is repeatedly provided on the QFN tape QT, and thus, it is possible to fabricate a plurality of optical semiconductor modules at a time.

The QFN tape is a tape in which, for example, the wire bondability, the resin leakage prevention property at resin sealing, or the like are improved compared to normal tapes. A wire 17 is bonded such that the electrode provided on the second surface 1B side of the optical device 1 and the lead frame 16F are connected to each other. At this time, the lead frame 16F and the optical device 1 are disposed on the QFN tape QT. Accordingly, the surface of the lead frame 16F and the surface of the optical device 1, which face the QFN tape QT, are aligned to each other with in a range of a slight reduction by the adhesive layer, and thus, are in substantially the same plane. In the process illustrated FIG. 2C, since the blind via 10V is disposed to face the QFN tape QT, to reduce the inflation pressure of the internal residual gas in the blind via 10V due to a heating process, it is preferable to perform the process in a slight vacuum state or in a state of providing a part of an opening in the QFN tape QT communicates with the blind via 10V.

Figure 2D:
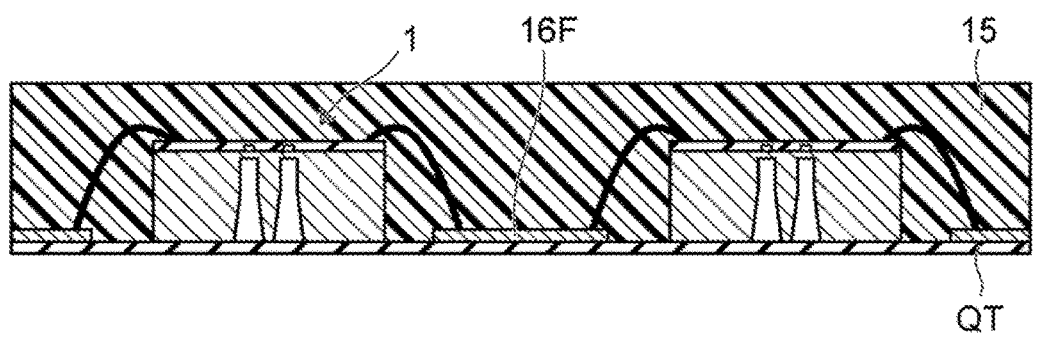

As illustrated in FIG. 2D, the resin 15 is next formed on the optical device 1 and the lead frame 16F. The resin 15 is, for example, an epoxy resin, a silicone resin, or the like.

Figure 2E:
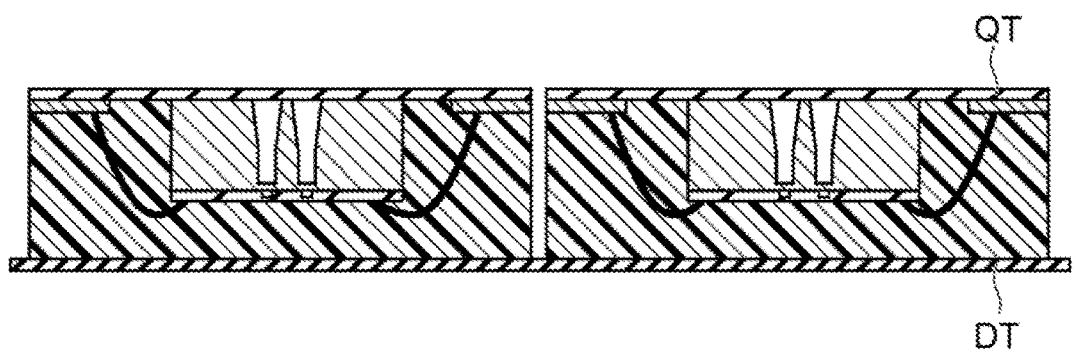

As illustrated in FIG. 2E, the optical device is separated into individual pieces by placing the device on the dicing tape DT such that a pasting side of the QFN tape QT faces upward. The QFN tape QT may be peeled off before the optical device is separated into individual pieces. Subsequently, the optical fiber 11 (not illustrated) is inserted into the blind via 10V of the optical device 1. The optical fiber 11 is fixed to the silicon substrate 10 by the transparent resin 12 or the like in a state of being inserted into the blind via 10V. In this way, the optical fiber 11 is optically coupled to the optical element 20 of the second surface 10B of the silicon substrate 10.

Figure 3A:
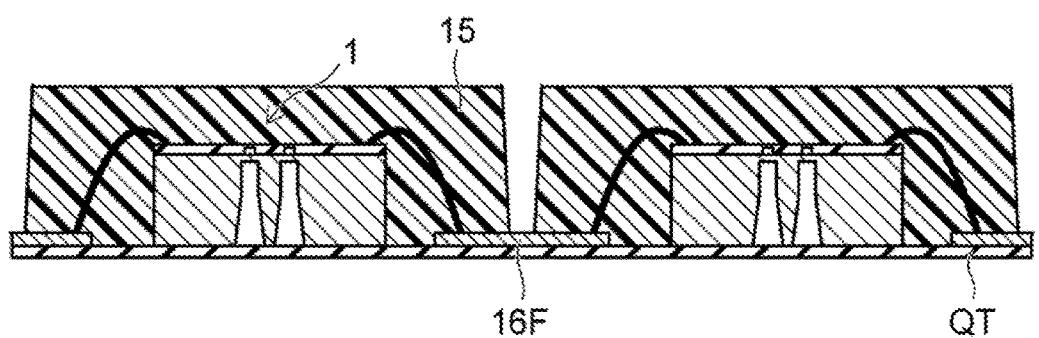
FIGS. 3A and 3B are schematic cross-sectional views illustrating a process of a method of manufacturing the optical semiconductor module according the first embodiment.
Figure 3B:
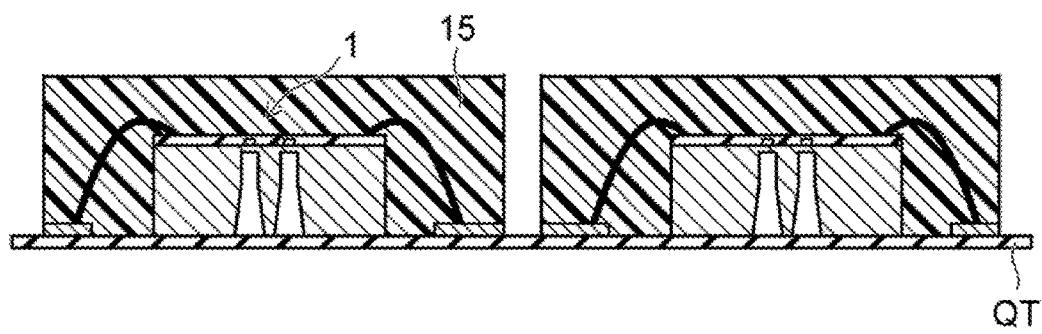

Instead of as shown in FIG. 2D, as illustrated in FIG. 3A, the resin 15 may be formed in a pattern such that the lead frame 16F is exposed, and thereafter, separated into individual pieces as illustrated in FIG. 3B. In this way, instead of trimming the composite material of the resin 15 and the lead frame 16F, it is possible to stabilize the process conditions by trimming or cutting of only the lead frame, and it is also possible to perform this dicing and cutting without changing the tape.

In an optical semiconductor module for large-scale industrial optical transmission such as optical communication in a trunk line system or an optical wiring between the large-scale information equipment, since the performance is emphasized, the limitations on materials to be used and inspection cost are relatively loose, and thus, it is not unusual that the cost will be several thousand times compared to the cost of consumer optical semiconductor element materials. However, in consumer equipment, the energy efficiency and performance may be superior when using uncompressed optical wiring compared to using bandwidth-compressing of the high definition video image and electronically transmitting the compressed video image. In addition, in industrial equipment, it may be more appropriate to use optical wiring than electrical wiring in the wiring inside the board. However, in applying the optical wiring to such equipment, cost reduction is essential, and a reduction of a marginal cost is required, in which the material cost becomes a dominating factor.

According to the present embodiment, it is possible to provide a highly reliable optical semiconductor module capable of being miniaturized and cost reduced.

That is, the optical device and the electrode lead are embedded on the same surface side of the resin. Therefore, the optical semiconductor element can be packaged without using a mounting substrate or a wiring substrate, and thus, the material cost can be reduced and moreover, the package can be thinned and miniaturized. In addition, since the stress on the optical device from the outside such as the light input/output side can be reduced by the resin or the connection portion provided in the resin, it is possible to realize a highly reliable semiconductor module which is less likely to deteriorate. In addition, an optical device capable of inputting and outputting light through the side opposite to the side on which the optical element is provided is formed to be sealed with the resin integrally with an electric terminal that can be connected to the outside, and the light input/output side and the electric terminal are formed on the same surface side. Therefore, since the electrical connection surface and the light input/output surface are in the same plane direction, it becomes easy to perform optical-electrical composite mounting on the optical interconnection inside of the board such as a printed circuit board with built-in optical waveguides, and thus, it is possible to improve the convenience and to miniaturize the size of the package. In addition, it is possible to reduce the manufacturing cost by using the lead frame as the electric terminal without an additional manufacturing process. In addition, the wire provided in the resin is used as the connection portion. Therefore, even in a case where the surface on which the electrode of the optical device is provided and the surface on which the electric terminal is provided are separated, those surfaces can easily be connected to each other, and thus, it is possible to reduce the stress from the outside using the relatively flexible wire. In addition, the first surface of the optical device, the upper surface of the electrode lead and the first surface of the resin make substantially the same plane. Therefore, it is possible to realize a package that is less likely to be broken and easy to handle.

Since the optical device on which the blind via is provided is used, the positions of the optical fiber and the optical element can be aligned with high accuracy without using a separate holder to hold the optical fiber, and thus, it is possible to realize the optical coupling of the optical fiber and the optical element with a simple and compact configuration.

For example, since the blind via into which the optical fiber is inserted does not pass through the silicon substrate, the optical element can be formed on the rear surface of the blind via. In this way, the silicon substrate supports the optical fiber and the optical element on the optical axis of the optical fiber. Furthermore, the optical element configured with a compound semiconductor is formed on the second surface of the silicon substrate or the optical element is directly formed on the second surface of the silicon substrate. Accordingly, since it becomes possible to mass-produce collectively on a wafer and the quality control can be easily performed, and thus, it is possible to reduce the cost.

First Modification Example

Figure 4:
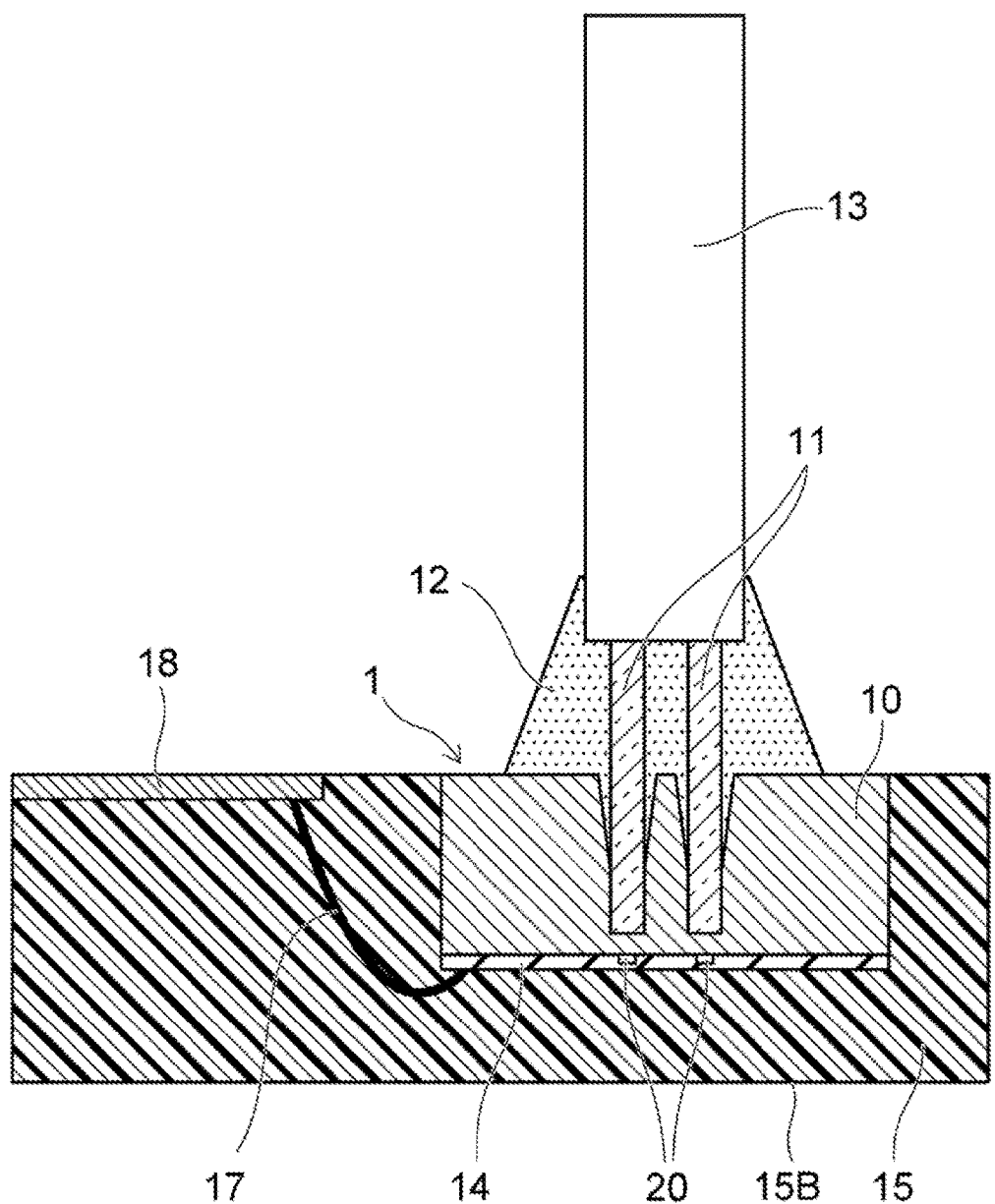
FIG. 4 is a schematic cross-sectional view illustrating an optical semiconductor module in a first modification example of the first embodiment.

FIG. 4 is schematic cross-sectional view illustrating an optical semiconductor module in a first modification example of the first embodiment. As illustrated in FIG. 4, the electric terminal can be used as a connector terminal 18 that can be connected to another electronic device.

According to the first modification example, in addition to the effect of the present embodiment, a part of the module functions as the connector terminal, for example, a connector plug, 18, and thus, the external electric connector can be simplified. That is, the electrical connector function is integrated, and thus, the number of components can be reduced and the cost reduction can be realized. Furthermore, it becomes unnecessary to attach an electric connector necessary for module mounting, and thus, mounting can be completed by merely inserting a module terminal into the electrical connector, for example, connector jack, of the mounting substrate. That is, both the module member and the mounting member can be reduced, which contributes to further reducing the cost of optical transmission. In addition, even if the stress to the connector terminal occurs due to insertion and removal of the electric connector or the tension of the cable, the stress can be reduced by the resin or connection portion provided in the resin, and thus, the optical element is less likely to deteriorate and it is possible to realize a highly reliable optical semiconductor module which is hard to deteriorate.

Second Modification Example

Figure 5:
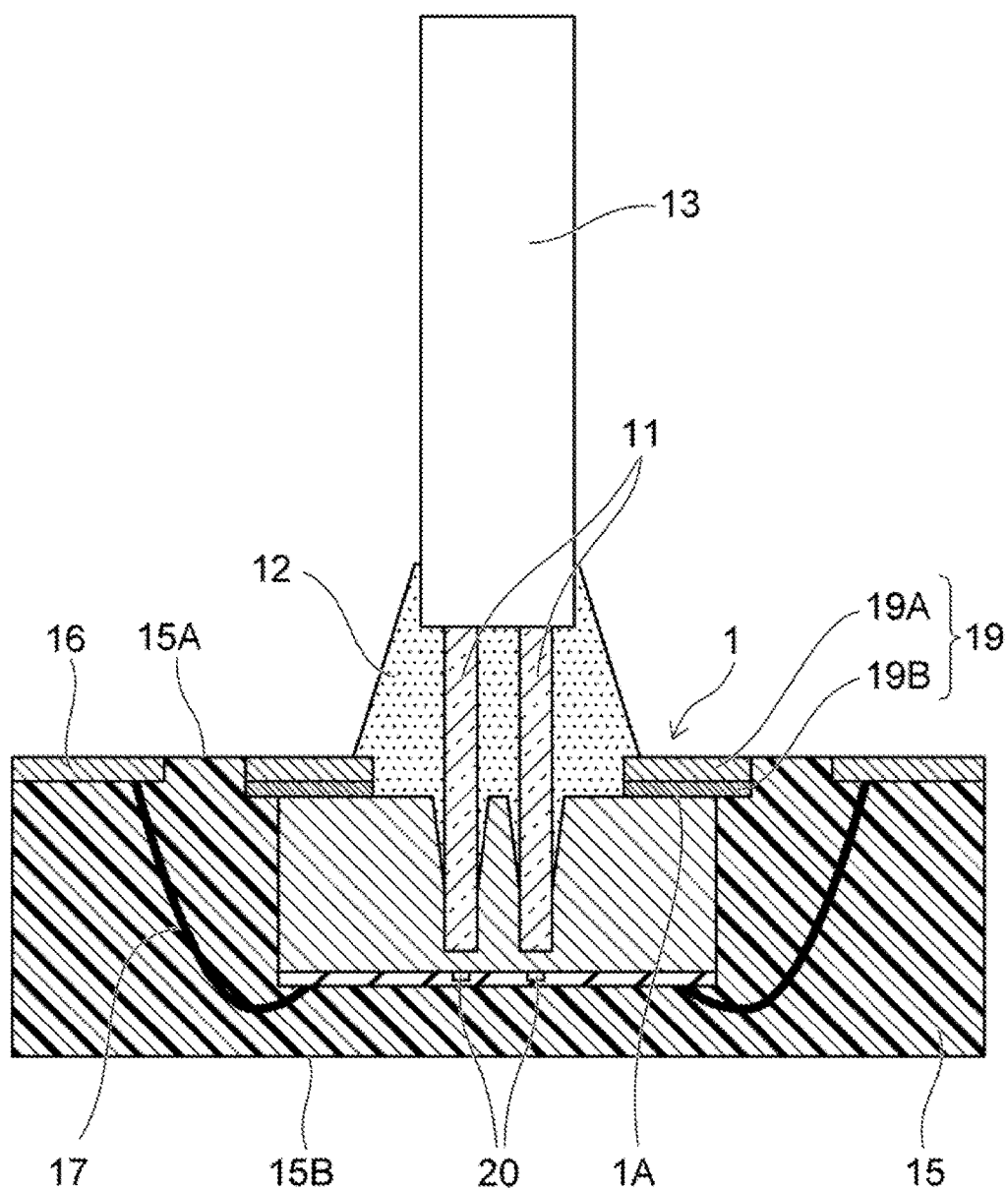
FIG. 5 is a schematic cross-sectional view illustrating an optical semiconductor module in a second modification example of the first embodiment.

FIG. 5 is schematic cross-sectional view illustrating an optical semiconductor module in a second modification example of the first embodiment. The optical device 1 and the electrode lead 16 are embedded in the same surface side of the resin 15. A member 19 is provided on the first surface 1A of the optical device 1. The member 19 includes a frame member 19A configured with a part of the lead frame and an adhesive material 19B which is provided between the frame member 19A and the optical device 1 and is configured with die paste or die film for connecting together the frame member 19A and the optical device 1. The upper surfaces of the electrode lead 16 and the frame member 19A and the first surface 15A of the resin 15 are in substantially the same plane.

Figure 6A:
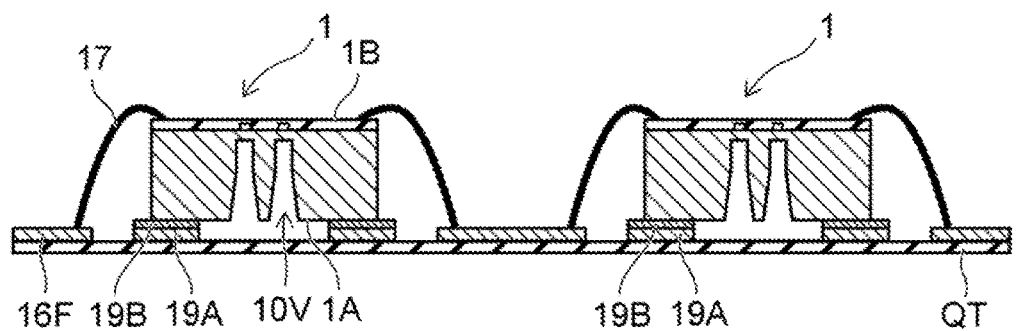
FIGS. 6A, 6B, and 6C are schematic cross-sectional views illustrating a process of a method of manufacturing the optical semiconductor module in the second modification example of the first embodiment.
Figure 6B:
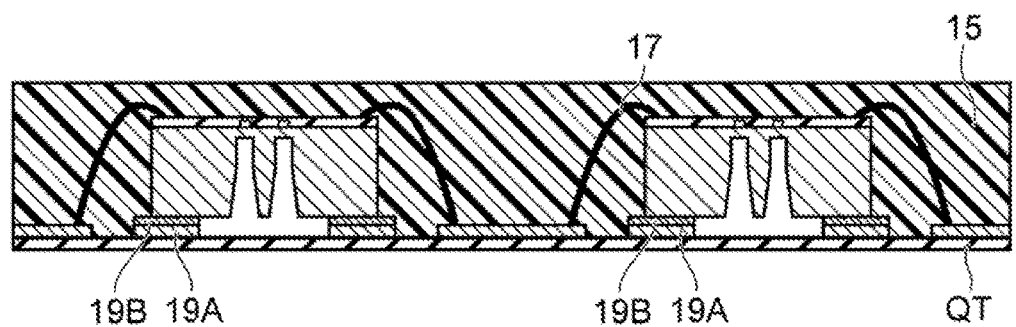
Figure 6C:
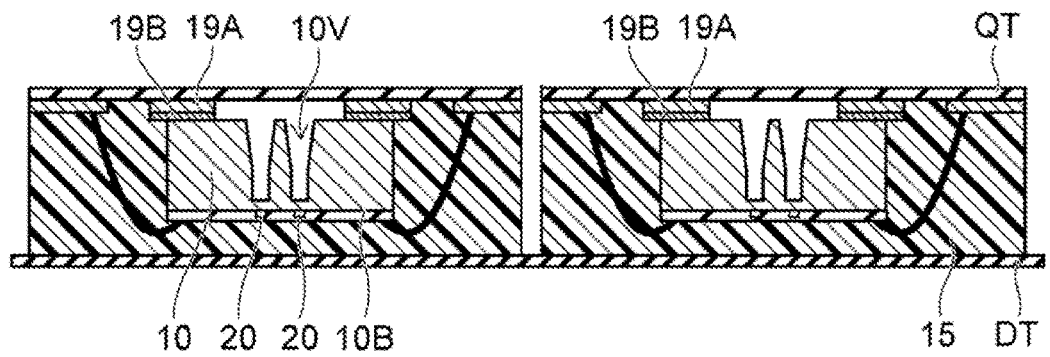

FIGS. 6A to 6C are schematic cross-sectional views illustrating a process of a method of manufacturing the optical semiconductor module in the second modification example of the first embodiment.

Subsequent to FIG. 2B, as illustrated in FIG. 6A, a lead frame 16F which will be the electrode lead 16 is placed on the QFN tape QT. The lead frames 16F for a plurality of modules are provided, and the optical element 20 is disposed at a predetermined position so as to be aligned with the lead frame 16F. That is, the optical device 1 is repeatedly provided on the QFN tape QT, and thus, it is possible to fabricate a plurality of optical semiconductor modules at a time. Here, on the lead frames 16F which will be the lead frames 19A, referred to as "frame members" hereinafter, on which the optical device 1 separated into the individual pieces is disposed, the adhesive materials 19B such as die paste or die films are provided. The wire 17 is bonded so as to connect the electrode provided on the second surface 1B side of the optical device 1 and the lead frame 16F to each other. At this time, since the lead frame 16F and the frame member 19A configured with a part of the lead frame are disposed on the QFN tape QT, the surface of the lead frame 16F and the surface of the frame member 19A, which face the QFN tape QT, are aligned to each other within a range of a slight reduction by the adhesive layer, and thus, form substantially the same plane. In the process illustrated FIG. 6A, since the blind via 10V is disposed to face the QFN tape QT, it is preferable to adhere in a depressurized state so as to reduce the internal pressure during the heating process, and to provide an opening in QFN tape QT so as to be connected to the blind via 10V.

As illustrated in FIG. 6B, the resin 15 is formed on the optical device 1 and the lead frame 16F. The resin 15 is, for example, an epoxy resin, a silicone resin, or the like.

As illustrated in FIG. 6C, the optical device is separated into individual pieces by placing the device on the dicing tape DT such that a pasting side of the QFN tape QT faces upward. The QFN tape QT may be peeled off before the optical device is separated into individual pieces. Subsequently, the optical fiber 11 (not illustrated) is inserted into the blind via 10V of the optical device 1. The optical fiber 11 is fixed to the silicon substrate 10 by the transparent resin 12 or the like in a state of being inserted into the blind via 10V. In this way, the optical fiber 11 is optically coupled to the optical element 20 of the second surface 10B of the silicon substrate 10.

According to the second modification example, since the optical device is disposed on the frame member which is a part of the lead frame, when forming a wire connecting the electrode of the optical device to the electric terminal, it is possible to perform bonding on a relatively hard surface. Therefore, a bonding accuracy can be improved, and thus, it is possible to provide a highly reliable connection portion. In addition, the top surfaces of the frame member and the electrode lead, and the first surface of the resin make substantially the same plane. Therefore, it is possible to realize a package that is less likely to be broken and easy to handle.

Third Modification Example

Figure 7A:
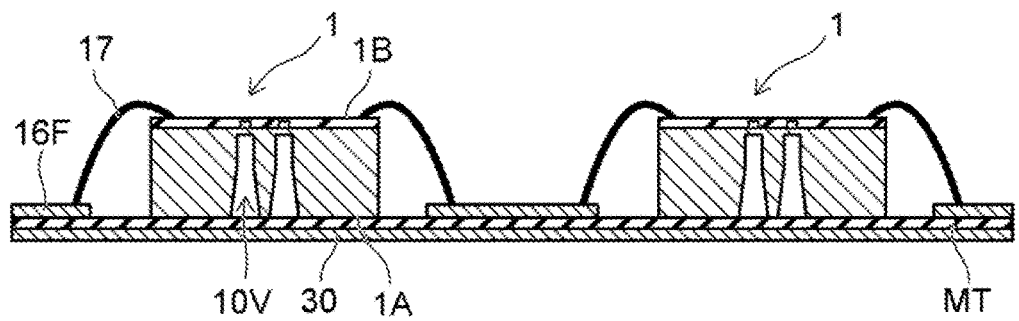
FIGS. 7A, 7B, and 7C are schematic cross-sectional views illustrating a process of a method of manufacturing an optical semiconductor module in a third modification example of the first embodiment.
Figure 7B:
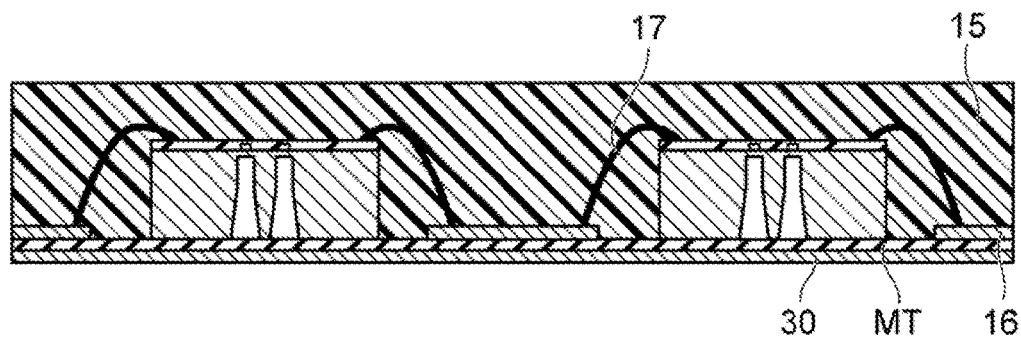
Figure 7C:
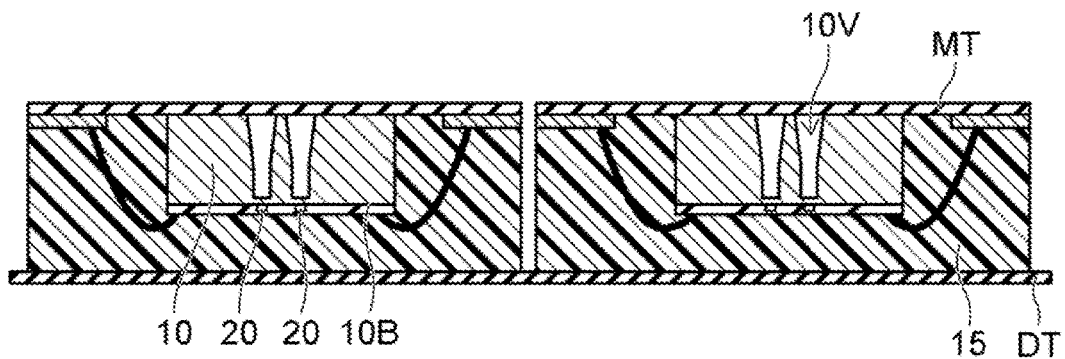

FIGS. 7A to 7C are schematic cross-sectional views illustrating a process of a method of manufacturing an optical semiconductor module in a third modification example of the first embodiment.

Subsequent to FIG. 2B, as illustrated in FIG. 7A, a mold tape MT which is a double-sided adhesive tape and having an excellent heat resistance during resin molding is provided on a lead frame 30 for reinforcement, and a lead frame 16F which is an electrode lead 16 and the optical device 1 separated into individual pieces are placed on the mold tape MT. The lead frames 16F for a plurality of modules are provided, and the optical element 20 is disposed at a predetermined position so as to be aligned with the positions of the lead frames 16F. That is, the optical device 1 is repeatedly provided on the mold tape MT, and thus, it is possible to fabricate a plurality of optical semiconductor modules at a time. The wire 17 is bonded so as to connect the electrode provided on the second surface 1B side of the optical device 1 and the lead frame 16F to each other.

At this time, the lead frame 16F and the optical device 1 are disposed on the mold tape MT. Accordingly, the surface of the lead frame 16F and the surface of the optical device 1, which face the mold tape MT, are aligned to form substantially the same plane. In FIG. 7A, since the blind via 10V is disposed so as to face the mold tape MT, it is preferable to adhere in a reduced pressure state so as to reduce the internal pressure during the heating process. In the present modification example, in FIG. 7A, the mold tape is placed on the lead frame 30, but not a mold tape, but a substrate-less double-sided tape which is only an adhesive layer may be used.

As illustrated in FIG. 7B, the resin 15 is formed on the optical device 1 and the lead frame 16F. The resin 15 is, for example, an epoxy resin, a silicone resin, or the like.

As illustrated in FIG. 7C, the optical device is separated into individual pieces by placing the device on the dicing tape such that the lead frame 30 and the mold tape MT pasting side faces upward and after the lead frame 30 is removed. The mold tape MT may be peeled off before the optical device is separated into individual pieces. Subsequently, the optical fiber 11 (not illustrated) is inserted into the blind via 10V of the optical device 1. The optical fiber 11 is fixed to the silicon substrate 10 by the transparent resin 12 or the like in a state of being inserted into the blind via 10V. In this way, the optical fiber 11 is optically coupled to the optical element 20 of the second surface 10B of the silicon substrate 10.

According to the third modification example, since the optical device is disposed on the lead frame, when forming a wire connecting the electrode of the optical device to the electric terminal, it is possible to perform bonding on a relatively hard surface. Therefore, a bonding accuracy can be improved, and thus, it is possible to provide a highly reliable connection portion. The first surface of the optical device, the upper surface of the electrode lead, and the first surface of the resin make substantially the same plane. Therefore, it is possible to realize a package that is hard to be broken and easy to handle.

In the present modification example, the optical device is disposed on the lead frame 30, but even if it is disposed on a semiconductor substrate such as a silicon substrate via a mold tape, the same effect can be obtained. Furthermore, when the optical device is disposed on the semiconductor substrate, in the process of forming the resin on the optical device and the lead frame, it is possible to reduce the difference in thermal expansion coefficient between the semiconductor substrate and the optical device. Therefore, it is possible to prevent an adverse influence such as a stress allied to the optical device due to deformation of the resin, and realize a reduction of the stress to the optical device.

Fourth Modification Example

Figure 8:
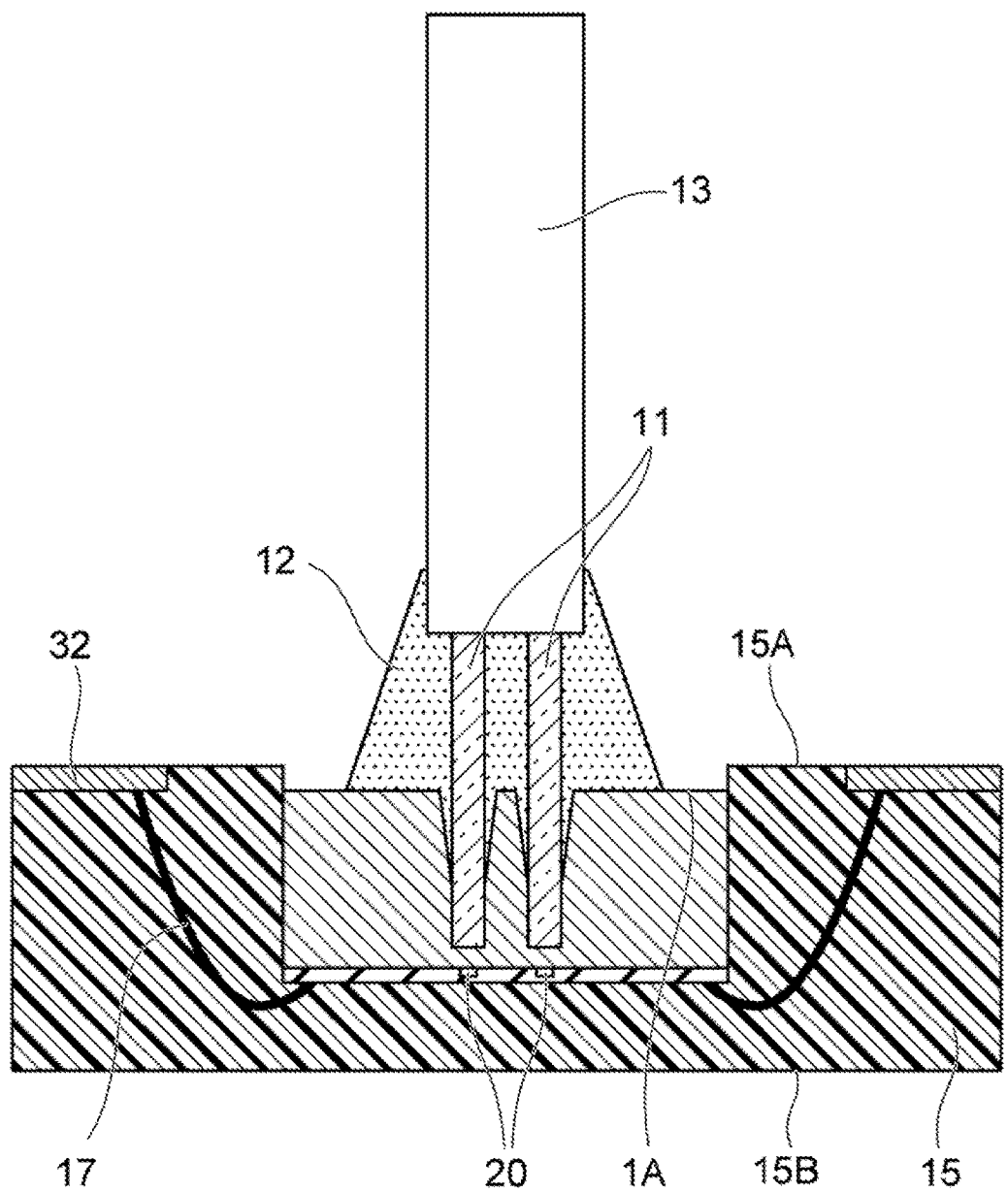
FIG. 8 is a schematic cross-sectional view illustrating an optical semiconductor module in a fourth modification example of the first embodiment.

FIG. 8 is a schematic cross-sectional view illustrating an optical semiconductor module in a fourth modification example of the first embodiment. The optical device 1 and the electrode lead 32 are embedded in the same surface side of the same of a resin 15. The upper surface of the electrode lead 32 and the first surface 15A of the resin 15 make substantially the same plane.

FIGS. 9A to 9D are schematic cross-sectional views illustrating a process of a method of manufacturing the optical semiconductor module in the fourth modification example of the first embodiment.

Figure 9A:
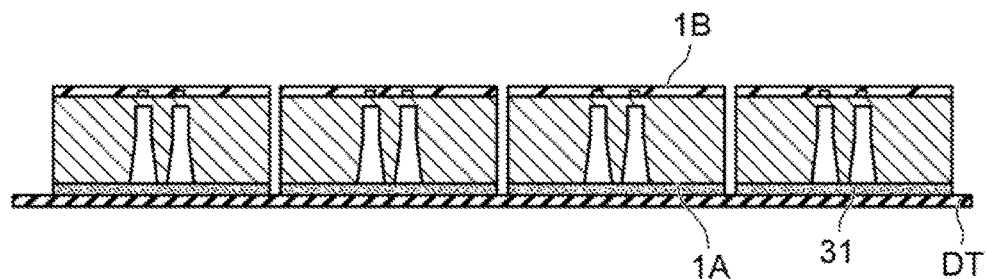
FIGS. 9A, 9B, 9C, and 9D are schematic cross-sectional views illustrating a process of a method of manufacturing the optical semiconductor module in the fourth modification example of the first embodiment.

Subsequent to FIG. 2A, as illustrated in FIG. 9A, the optical device 1 is provided on the adhesive material 31 such as die paste or die film on the dicing tape DT. The first surface 1A of the optical device 1 is placed so as to face the adhesive material 31. Subsequently, the optical device 1 is separated into individual pieces on the dicing tape DT together with the adhesive material 31. In the process illustrated FIG. 9A, since the blind via 10V is disposed to face the dicing tape DT, it is preferable to adhere in a reduced pressure state so as to reduce the internal pressure during the heating process.

Figure 9B:
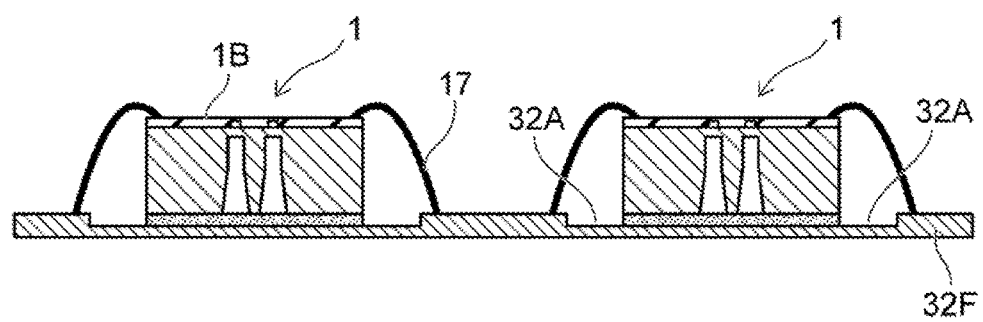

As illustrated in FIG. 9B, a lead frame 32F is prepared, in which the recess portion 32A is provided in the portion where the optical device 1 is disposed and the peripheral region. The recess portion 32A of the lead frame 32F has a thin lead frame and may be formed by performing half etching. Alternatively, a part of the lead frame 32F may be formed by pressing, and then, making a recess. In this case, photolithography and additional etching for half etching are unnecessary. The optical device 1 is placed in the recess portion 32A of the lead frame 32F. The wire 17 is bonded so as to connect the electrode provided on the second surface 1B side of the optical device 1 and the lead frame 32F to each other.

Figure 9C:
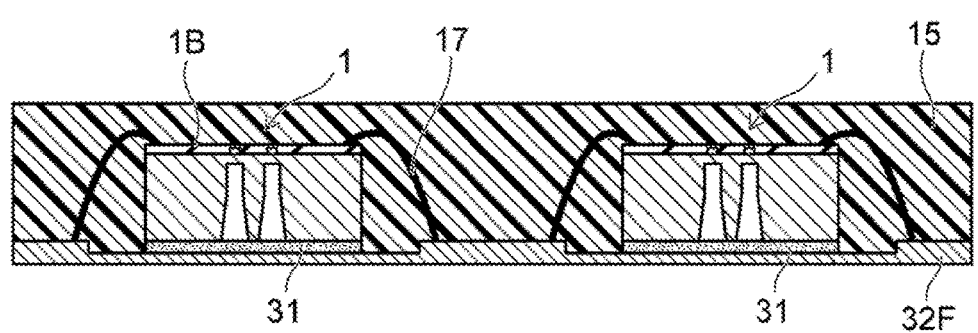

As illustrated in FIG. 9C, the resin 15 is formed on the optical device 1 and the lead frame 32F. For example, the resin 15 is an epoxy resin, a silicone resin, or the like.

Figure 9D:
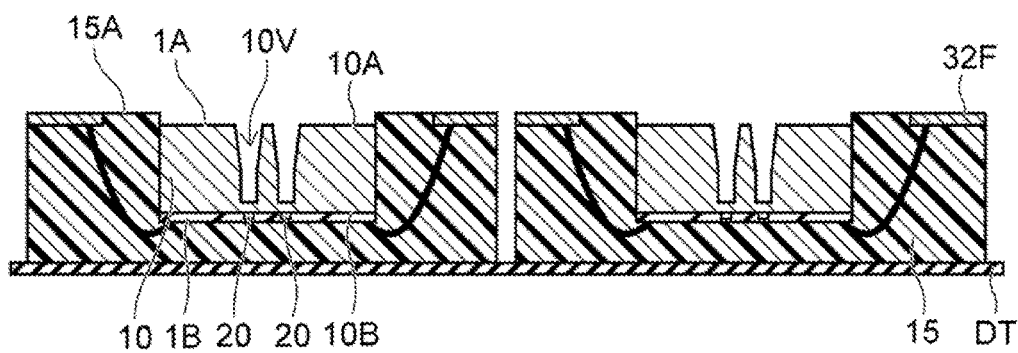

As illustrated in FIG. 9D, the lead frame 32F is placed on the dicing tape DT such that the lead frame 32F side faces upward, and chemical mechanical polishing (CMP) is performed to polish the lead frame 32F until the upper surface of the resin 15 is exposed, and then, the lead frame 32F is flattened. In this way, the optical device 1 and the electrode lead 32 are in a state of being embedded in the same surface side of the resin 15. The upper surface of the electrode lead 32 and the first surface 15A of the resin 15 are polished such that the surfaces thereof are aligned, and thus, a continuous surface is formed to form the same plane. Thereafter, the adhesive material 31 provided on the first surface 1A of the optical device 1 is removed and the optical device 1 is separated into individual pieces. Subsequently, an optical fiber 11 (not illustrated) is inserted into the blind via 10V of the optical device 1. The optical fiber 11 is fixed to the silicon substrate 10 by the transparent resin 12 or the like in a state of being inserted into the blind via 10V. In this way, the optical fiber 11 is optically coupled to the optical element 20 of the second surface 10B of the silicon substrate 10.

According to the fourth modification example, since the optical device is disposed on the lead frame on which the recess portion is provided, when forming a wire connecting the electrode of the optical device to the electric terminal, it is possible to perform bonding on a relatively hard surface. Therefore, a bonding accuracy can be improved, and thus, it is possible to provide a highly reliable connection portion. In addition, the upper surface of the electrode lead and the first surface of the resin make the same plane. Therefore, it is possible to realize a package that is hard to be broken and easy to handle.

Fifth Modification Example

Figure 10:
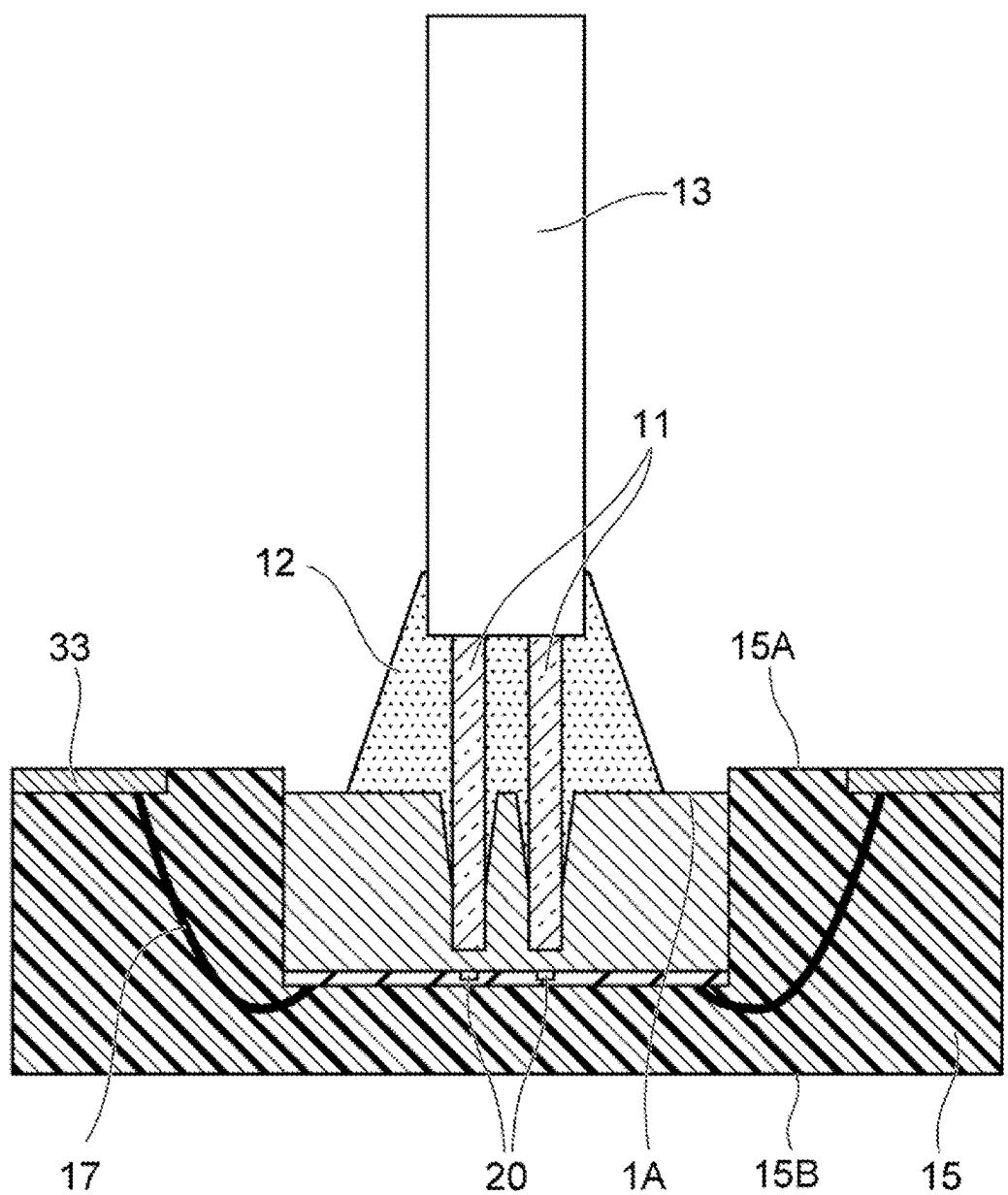
FIG. 10 is a schematic cross-sectional view illustrating an optical semiconductor module in a fifth modification example of the first embodiment.

FIG. 10 is a schematic cross-sectional view illustrating an optical semiconductor module in a fifth modification example of the first embodiment. The optical device 1 and a wiring layer 33 are embedded on the same surface side of the same as the resin 15. The top surface of the wiring layer 33 provided as an electric terminal and the first surface 15A of the resin 15 make substantially the same plane.

FIGS. 11A to 11D are schematic cross-sectional views illustrating a process of a method of manufacturing the optical semiconductor module in the fifth modification example of the first embodiment.

Figure 11A:
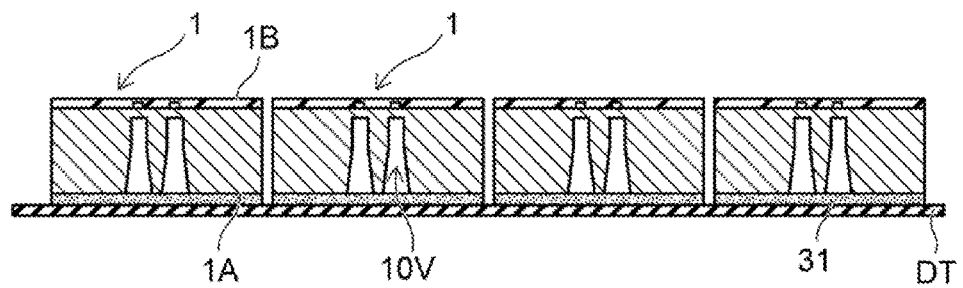
FIGS. 11A, 11B, 11C, and 11D are schematic cross-sectional views illustrating a process of a method of manufacturing the optical semiconductor module in the fifth modification example of the first embodiment.

Subsequent to FIG. 2A, as illustrated in FIG. 11A, the optical device 1 is provided on the adhesive material 31 such as die paste or die film on the dicing tape DT. The first surface 1A of the optical device 1 is placed so as to face the adhesive material 31. Subsequently, the optical device 1 is separated into individual pieces on the dicing tape DT together with the adhesive material 31. In the process illustrated FIG. 11A, since the blind via 10V is disposed to face the dicing tape DT, it is preferable to adhere in a reduced pressure state so as to reduce the internal pressure during the heating process.

Figure 11B:
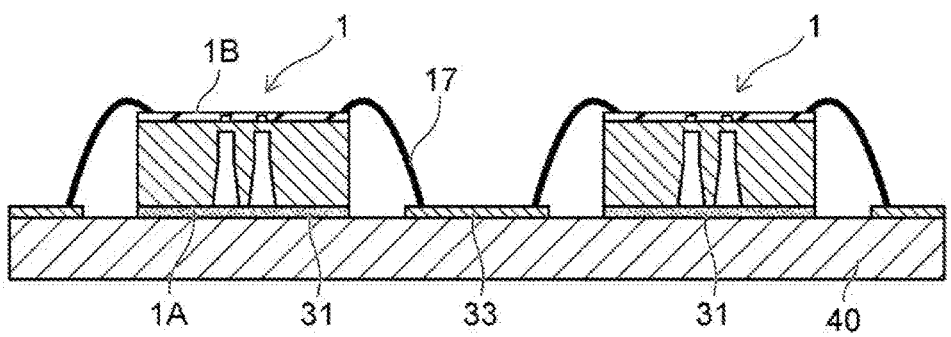

As illustrated in FIG. 11B, a wiring layer 33 is formed on a substrate 40 such as a silicon substrate, and the optical device 1 is disposed thereon. The wire 17 is bonded so as to connect the electrode provided on the second surface 1B side of the optical device 1 and the wiring layer 33 to each other.

Here, an organic substrate, for example, a 400 mm square, for printed circuit boards may be used instead of the silicon substrate, a maximum of 12 inches at present, or a large glass substrate, for example, 1 m×1.2 m, for producing a liquid crystal display, can also be used. In this way, it is possible to increase the number of modules that can be created at a time, and to reduce processing costs and material costs. In this case, a thermal expansion coefficient of the resin 15 is adjusted to match the substrate material and substrate size.

Figure 11C:
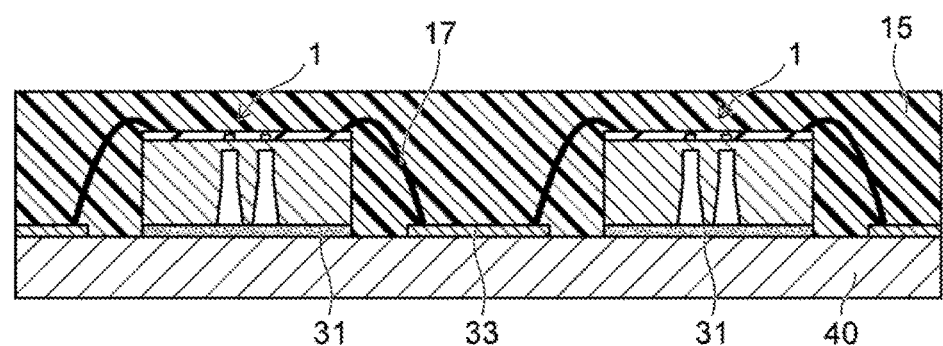

As illustrated in FIG. 11C, the resin 15 is formed on the optical device 1 and the wiring layer 33. The resin 15 is, for example, an epoxy resin, a silicone resin, or the like.

Figure 11D:
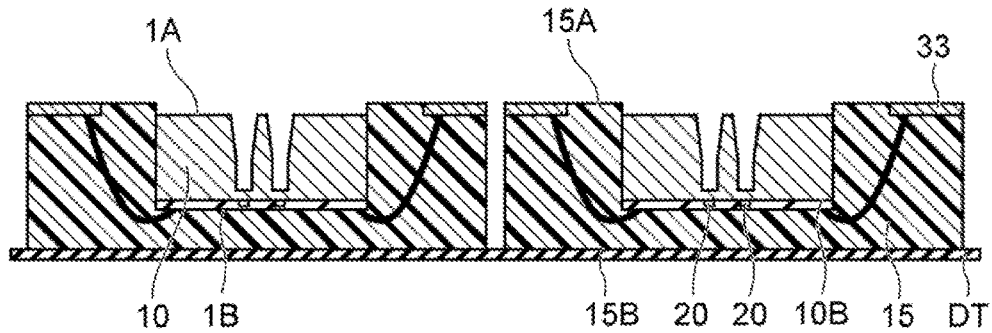

As illustrated in FIG. 11D, the resin 15 is placed on the dicing tape DT such that the substrate 40 side faces upward, and the substrate 40 is removed by, for example, etching or the like to expose the upper surface of the resin 15. In this way, the optical device 1 and electrode lead 32 are in a state of being embedded on the same surface side of the resin 15. The upper surface of the wiring layer 33 and the first surface 15A of the resin 15 are aligned with each other and make substantially the same plane. Thereafter, the adhesive material 31 provided on the first surface 1A of the optical device 1 is removed, and the optical device 1 is separated into individual pieces. Subsequently, an optical fiber 11 (not illustrated) is inserted into the blind via 10V of the optical device 1. The optical fiber 11 is fixed to the silicon substrate 10 by the transparent resin 12 or the like in a state of being inserted into the blind via 10V. In this way, the optical fiber 11 is optically coupled to the optical element 20 of the second surface 10B of the silicon substrate 10.

According to the fifth modification example, since the optical device is disposed on the substrate such as a semiconductor substrate, when forming a wire connecting the electrode of the optical device to the electric terminal, it is possible to perform bonding on a relatively hard surface. Therefore, a bonding accuracy can be improved, and thus, it is possible to provide a highly reliable connection portion. In addition, the upper surface of metal wiring and the first surface of a resin make substantially the same plane. Therefore, it is possible to realize a package that is hard to be broken and easy to handle.

In addition, without using a lead frame, the metal wiring is provided as it is as an electric terminal. Therefore, it is possible to provide a thin electric terminal and simplify the manufacturing process, and thus, the number of elements can be reduced.

Furthermore, when the optical device is disposed on the semiconductor substrate, in the process of forming the resin on the optical device and the metal wiring, it is possible to reduce the difference in thermal expansion coefficient between the semiconductor substrate and the optical device. Therefore, it is possible to prevent an adverse influence such as a stress applied to the optical device due to deformation of the resin, and realize a reduction of the stress to the optical device.

Second Embodiment

Next, an optical semiconductor module in the second embodiment will be described. Since the basic configuration is the same as that in the first embodiment, the description of the items described in the first embodiment will be omitted.

Figure 12:
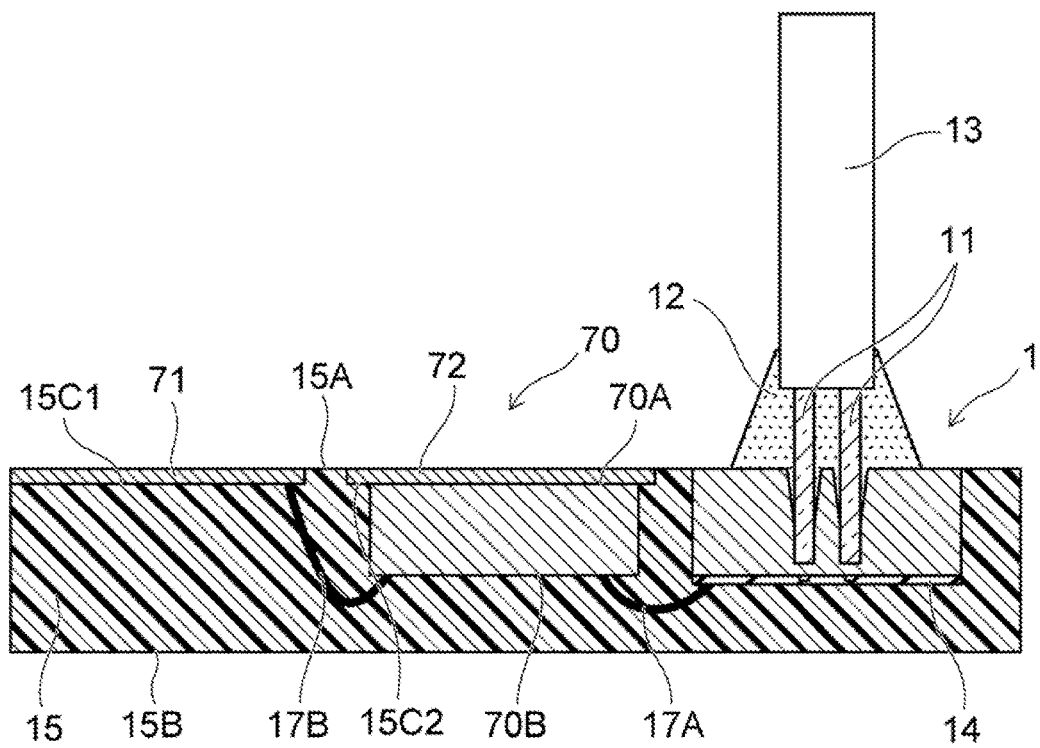
FIG. 12 is a schematic cross-sectional view of an optical semiconductor module according to a second embodiment.

FIG. 12 is a schematic cross-sectional view of the optical semiconductor module according to the second embodiment. The present embodiment is different from the first embodiment in a point that an integrated circuit (IC) that acts as an optical element drive device 70 is further provided. The optical element drive device 70 is provided between the optical device 1 and a connector terminal 71 used as an electric terminal. The connector terminal 71 can be used as a terminal connectable to another electronic device.

As illustrated in FIG. 12, the resin 15 includes a first surface 15A and a second surface 15B on the opposite side to the first surface, and the connector terminal 71 is embedded on the first surface 15A side of the resin 15. The connector terminal 71 is provided on the resin 15 such that at least a part of surface thereof is exposed from the resin 15. A first recess portion 15C1 is provided on the first surface 15A of the resin 15 as a part of the first surface 15A such that the upper surface and the side surface of the connector terminal 71 are exposed in the first recess portion 15C1. The connector terminal 71 is provided such that, for example, the bottom surface and the side surface are covered with the resin 15.

The top surface of the connector terminal 71 and the first surface 15A of the resin 15 make substantially the same plane. Here, "substantially the same plane" includes a case where there are microscopic steps and irregularities within 20 μm, preferably within 5 μm without considering microscopic irregularities on the surface electrode or a deviation occurring in the manufacturing process. The deviation occurring in the manufacturing process means a deviation of an embedded height of the optical device 1 caused by pushing the optical device into the adhesive layer due to the thickness and elasticity of the adhesive layer of tape when providing, for example, the optical device on the adhesive tape described below.

It is preferable to use, for example, the epoxy resin or the silicone resin containing a silica filler such that a coefficient of thermal expansion matches the semiconductor material as the resin 15, and it is preferable to use a resin for wafer level package that can control wafer warpage by adjusting the elastic modulus of the resin.

The connector terminal 71 is a part of the lead frame, and is a metal piece separated from the lead frame when the optical device is separated into individual pieces. The lead frame is a frame having for example, a constant arrangement pitch. A lead frame 71 is prepared by, for example, applying photolithography and etching on one copper plate, for example, the thickness of 150 μm, and the electric terminals for a plurality of modules are integrated by a support frame. Therefore, the electric terminals for all the modules can be handled collectively. As the material for the lead frame, for example, oxygen free copper, copper alloy (CuAg, CuZn, CuSnP, CuFeP, or the like), iron alloy (FeNi, or the like), and the like can be used. To prevent corrosion and oxidation, a plating treatment with Sn, Ni, Au/Ni, or the like may be applied to the surface of the lead frame. The plating layer formed by the plating treatment may be formed on the entire surface of the lead frame 71 in advance, or may be selectively formed only on the exposed portion after forming the resin or the electric terminal.

In addition, a part of the lead frame is provided in a portion on which the optical element drive device 70 is provided as the heat dissipating plate 72 for dissipating the heat of the optical element drive device.

As illustrated in FIG. 12, the optical element drive device 70 is embedded on the first surface 15A side of the resin 15. The heat dissipating plate 72 is provided on the upper surface of the optical element drive device 70. A part of the lead frame as the heat dissipating plate 72 is provided on the resin 15 such that at least a part of the surface thereof is exposed from the resin 15. The second recess portion 15C2 is provided on the first surface 15A of the resin 15 as a part of the first surface 15A, and the optical element drive device 70 is provided in the second recess portion 15C2. The optical element drive device 70 includes a first surface 70A and a second surface 70B on the opposite side to the first surface, and is provided such that the first surface 70A of the optical element drive device 70 faces the heat dissipating plate 72. The first surface 70A of the optical element drive device 70 is provided adjacent to the first surface 15A of the resin 15. The heat dissipating plate 72 is provided such that the upper surface thereof is exposed from the resin 15. The heat dissipating plate 72 is provided such that, for example, the bottom surface and the side surface thereof are covered by the resin 15 and the optical element drive device 70. Here, the upper surface of the heat dissipating plate 72 and the first surface 15A of the resin 15 are provided adjacent to each other, and make substantially the same plane.

The electrode (not illustrated) provided in the insulating layer 14 of the optical device 1 is connected to the electrode provided on the second surface 70B side of the optical element drive device 70 via the first wire 17A such as a bonding wire provided in the resin as a first connection portion. Materials such as gold, aluminum, copper, or silver can be used as a material for the wire. Furthermore, another electrode (not illustrated) provided on the second surface 70B side of the optical element drive device 70 is connected to the connector terminal 71 provided as an electric terminal via the second wire 17B such as the bonding wire provided in the resin as a second connection portion. Here, the wire is a wiring that is relatively thin and easy to bend, and has a curved shape, and can electrically connect the electrodes having different heights by bonding or the like without being in contact with the lower layer.

As described above, the resin 15 holds the optical device 1, the optical element drive device 70, the optical device 1, and the connector terminal 71 which are separately provided from each other. In addition, the optical device 1, optical element drive device 70, and the connector terminal 71 are embedded on the same surface side of the resin 15. In addition, a first connection portion that electrically connects the electrode of the optical device 1 and the electrode of the optical element drive device 70 to each other and a second connection portion that electrically connects the connector terminal 71 and the other electrode of the optical element drive device 70 to each other are provided in the resin 15.

In this way, the optical semiconductor module is configured by covering the optical device 1, the optical element drive device 70, and a part of the electric terminal by the resin 15. The optical device 1, the optical element drive device 70, and the part of the electric terminal are continuously covered by the resin 15 and are integrally formed. In the present embodiment, the optical device 1, the optical element drive device 70, and the part of the electric terminal are continuously covered by the single resin 15.

According to the present embodiment, it is possible to provide a highly reliable optical semiconductor module capable of being miniaturized and cost reduction.

That is, the optical device, the optical element drive device, and the electric terminal are embedded in the same surface side of the resin. Therefore, the optical semiconductor element and the optical element drive device can be packaged without using a mounting substrate or a wiring substrate, and thus, the package can be miniaturized. In addition, since the stress on the optical device from the outside such as the light input/output side can be reduced by the resin or the connection portion provided in the resin, it is possible to realize a highly reliable semiconductor module which is less likely to deteriorate. In addition, an optical device capable of inputting and outputting light through the side opposite to the side on which the optical element is provided is formed to be sealed with the resin integrally with an electric terminal that can be connected to the outside, and the light input/output side and the electric terminal are formed on the same surface side. Therefore, since the electrical connection surface and the light input/output surface are in the same plane direction, it becomes easy to perform optical-electrical composite mounting on the optical interconnection inside of the board such as a printed circuit board with built-in optical waveguides, and thus, it is possible to improve the convenience and to miniaturize the size of the package. In addition, it is possible to reduce the manufacturing cost by using the lead frame as it is as the electric terminal (e.g., a connector terminal). In addition, the wire provided in the resin is used as the connection portion. Therefore, even in a case where the surface on which the electrode of the optical device is provided and the surface on which the electric terminal is provided are separated, those surfaces can easily be connected to each other, and thus, it is possible to reduce the stress from the outside using the relatively flexible wire. In addition, the electric terminal is used as the connector terminal. Therefore, a part of the module functions as a connector terminal, for example, a connector plug, and thus, it is possible to simplify the external electric connector. That is, the electrical connector function is integrated, and thus, the number of components can be reduced and the cost reduction can be realized. Furthermore, it becomes unnecessary to attach an electric connector necessary for module mounting, and thus, mounting can be completed by merely inserting a module terminal into the electrical connector, for example, connector jack, of the mounting substrate. That is, both the module member and the mounting member can be reduced, which contributes to further reducing the cost of optical transmission. In addition, even if the stress to the connector terminal occurs due to insertion and removal of the electric connector or the tension of the cable, the stress can be reduced by the resin or connection portion provided in the resin, and thus, the optical element is less likely to deteriorate and it is possible to realize a highly reliable optical semiconductor module which is less likely to deteriorate.

Furthermore, the optical element drive device can be formed to be sealed with the resin integrally with the electric terminal that can be connected to the optical device and the outside, and thus, the more compact integration can be performed. Therefore, it is possible to further improve the convenience of the optical semiconductor module and miniaturize the size of the package. In addition, the heat dissipating plate is provided so as to contact the optical element drive device generating a large amount of heat. Therefore, the thermal resistance can be further reduced and the adverse effect on the optical device can be prevented. In addition, it is possible to reduce the manufacturing cost by using the lead frame as it is not only as the electric terminal (e.g., a connector terminal) but also as the heat dissipating plate of the optical element drive device.

Third Embodiment

The optical device 1 is not limited to the structure described in the above embodiments, but any structure may be available as long as the light can be input and output through the first surface 1A and the optical element is formed on the second surface 1B side.

In the present embodiment, a configuration example of the optical device using a blind via and a configuration example of an aperture of the blind via are described. For other configurations, the configurations described in the first and second embodiments can be used.

Optical Semiconductor Module in Configuration Example 1

Figure 13:
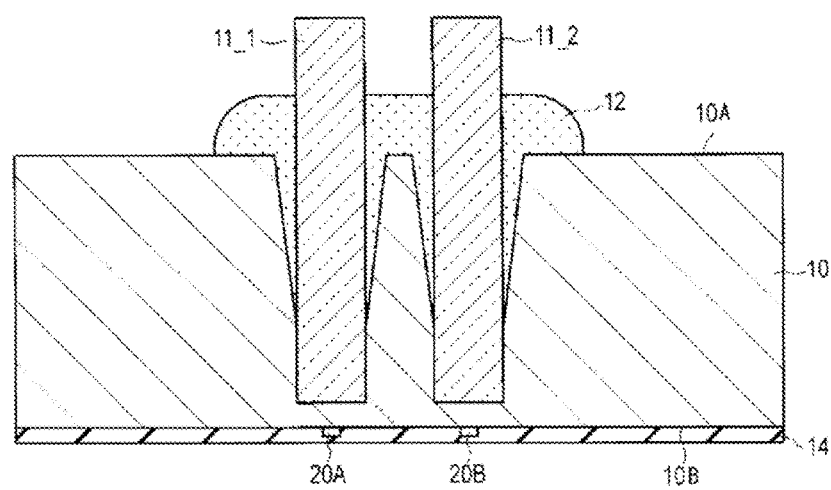
FIG. 13 is a schematic cross-sectional view of a configuration example 1 of an optical semiconductor module according to a third embodiment.

FIG. 13 illustrates an example of an optical semiconductor module in which a light transmitter and a light receiver are integrated into a single module with the optical element 20 illustrated in FIG. 1 being a pair of light-emitting element 20A and light-receiving element 20B. For example, a surface light emitting semiconductor laser can be applied as the light-emitting element 20A. For example, a pin-type diode, a metal-semiconductor-metal (MSM) type diode, or the like can be applied as the light-receiving element 20B. Hereinafter, two optical fibers are denoted as 11_1 and 11_2 respectively, and it is assumed that the term optical fiber 11 refers to each of the optical fibers 11_1 and 11_2.

As illustrated in FIG. 13, the light-emitting element 20A or the light-receiving element 20B is respectively provided on the second surface 10B of the silicon substrate 10. The light-emitting element 20A is disposed on the optical axis of the optical fiber 11_1, and the light-receiving element 20B is disposed on the optical axis of the optical fiber 11_2. Furthermore, an insulating layer 14 is provided on the light-emitting element 20A, the light-receiving element 20B, and the second surface.

Optical Semiconductor Module in Configuration Example 2

Hereinafter, a portion that is different from the configuration illustrated in FIG. 13 will be mainly described. This configuration example 2 represents a configuration in which the light-emitting element 20A or the light-receiving element 20B is not directly disposed on the optical axis of the optical fiber 11.

Figure 14:
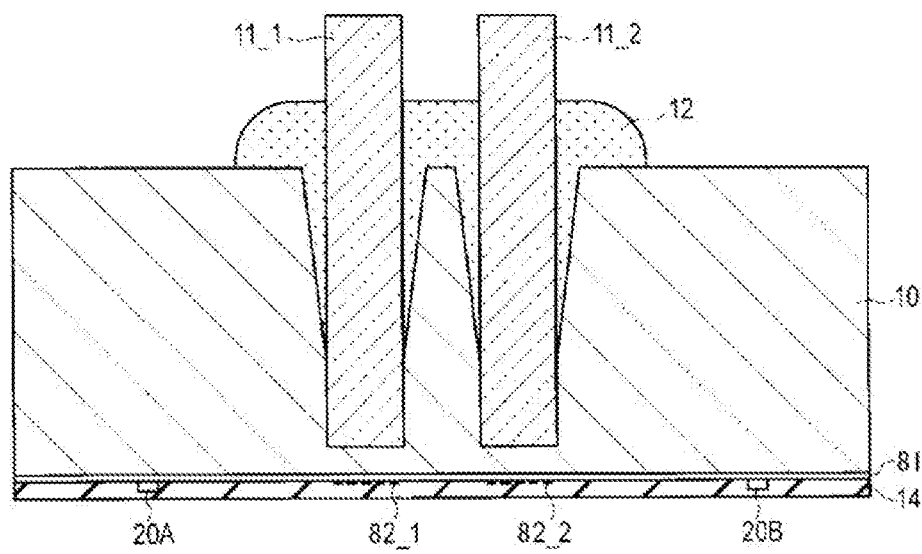
FIG. 14 is a schematic cross-sectional view of a configuration example 2 of the optical semiconductor module according to the third embodiment.

FIG. 14 is a cross-sectional view of the blind via in the configuration example 2 of the optical semiconductor module illustrated in FIG. 1. As illustrated, an optical waveguide 81 is disposed on the second surface 10B of the silicon substrate 10, and diffraction gratings (or reflection mirrors) 82_1 and 82_2 are disposed on the optical axis of the optical fiber 11 as an optical element on the optical waveguide 81. In addition, the light-emitting element 20A or the light-receiving element 20B is disposed on the optical waveguide 81 separated from the optical axis of the optical fibers 11_1 and 11_2.

The diffraction grating 82_1 diffracts the light emitted from the light-emitting element 20A and bends it to the optical fiber 11_1. The diffraction grating 82_2 diffracts the light emitted from the optical fiber 11_2 and bends it to the light-receiving element. The optical waveguide 81 transmits the light emitted from the light-emitting element 20A to the diffraction grating 82_1. In addition, the optical waveguide 81 transmits the light diffracted by the diffraction grating 82_2 to the light-receiving element 20B. Furthermore, an insulating layer 14 is provided on the light-emitting element 20A, the light-receiving element 20B, and the optical waveguide 81.

The optical semiconductor module having the configuration illustrated in FIG. 14 performs the following operations.

The light emitted from the light-emitting element 20A is incident on the diffraction grating 82_1 via the optical waveguide 81. The light that is incident on the diffraction grating 82_1 is diffracted by the diffraction grating 82_1, passes through the silicon substrate between the second surface 10B and the bottom surface of the blind via 10V, and is incident on the end portion of the optical fiber 11_1. The light that is incident on the end portion of the optical fiber 11_1 propagates through the optical fiber 11_1 and is incident on the light-receiving element (not illustrated) located at the other end portion of the optical fiber 11_1.

In addition, the light emitted from the optical fiber 11_2 passes through the silicon substrate between the bottom surface of the blind via 10V and the optical waveguide 81, and is incident on the diffraction grating 82_2. The light that is incident on the diffraction grating 82_2 is diffracted by the diffraction grating 82_2, and is incident on the light-receiving element 20B via the optical waveguide 81. The light that is incident on the light-receiving element 20B is photoelectrically converted to an electric signal by the light-receiving element 20B.

Optical Semiconductor Module in Configuration Example 3

This configuration example 3 is an example in which an optical modulator is disposed between the light-emitting element 20A and the diffraction grating 82_1 in the configuration illustrated in FIG. 13.

Figure 15:
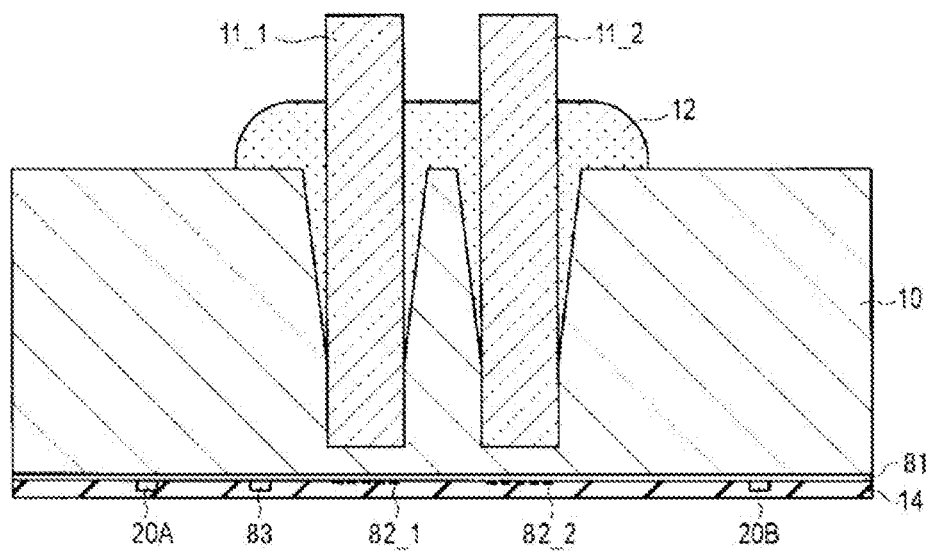
FIG. 15 is a schematic cross-sectional view of a configuration example 3 of the optical semiconductor module according to the third embodiment.

FIG. 15 is a cross-sectional view of the blind via of the optical semiconductor module illustrated in FIG. 1 in the configuration example 3. As illustrated, an optical modulator 83 is disposed between the light-emitting element 20A and a diffraction grating or the reflection mirror 82_1. The optical modulator 83 modulates the wavelength of the light emitted from the light-emitting element 20A and emits the modulation resulting light to the optical waveguide 81.

The optical semiconductor module having the configuration illustrated in FIG. 15 performs the following operations.

The light emitted from the light-emitting element 20A passes through the optical waveguide 81, and then is incident on the optical modulator 83. The wave length of the light that is incident on the optical modulator 83 is modulated by the optical modulator 83, and the modulation resulting light is incident on the diffraction grating 82_1 via the optical waveguide 81. The light that is incident on the diffraction grating 82_1 is diffracted by the diffraction grating 82_1, passes through the silicon substrate, and is incident on the end portion of the optical fiber 11_1.

Optical Semiconductor Module in Configuration Example 4

This configuration example 4 is an example in which a ball lens is disposed between the end portion of the optical fiber and the bottom surface of the blind via in the configuration shown in FIG. 13.

Figure 16:
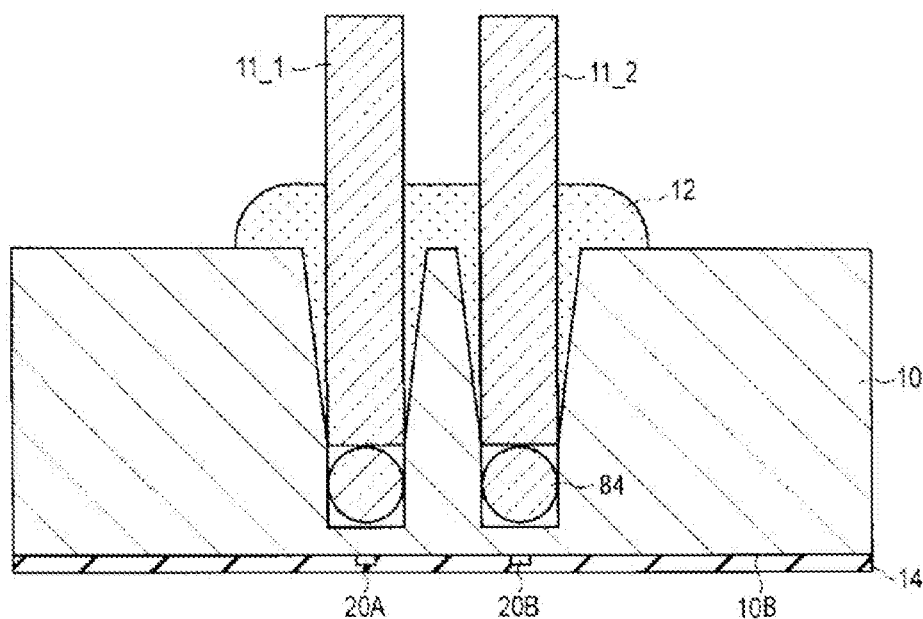
FIG. 16 is a schematic cross-sectional view illustrating a configuration example 4 of the optical semiconductor module according to the third embodiment.

FIG. 16 is a cross-sectional view of the blind via of the optical semiconductor module illustrated in FIG. 1 in the configuration example 4. As illustrated, a ball lens 84 is disposed between the end portion of each of the optical fibers 11_1 and 11_2 and the bottom surface of the blind via 10V. A space between the ball lens 84 and the bottom surface of the blind via 10V may be filled with the resin 12, or air may exist in the space. The ball lens 84 is configured with, for example, silicon or glass having a high refractive index.

The optical semiconductor module having the configuration illustrated in FIG. 16 performs the following operation.

The light emitted from the light-emitting element 20A is transmitted through the silicon substrate between the second surface 10B and the bottom surface of the blind via 10V, and further passes through the ball lens 84, and then, is incident on the end portion of the optical fiber 11_1.

In addition, the light emitted from the optical fiber 11_2 passes through the ball lens 84, is transmitted through the silicon substrate between the bottom surface of the blind via 10V and the second surface 10B, and then, is incident on the light-receiving element 20B.

Optical Semiconductor Module in Configuration Example 5

This configuration example 5 is an example in which a coaxial lens is disposed between the end portion of each of the optical fiber and the bottom surface of the blind via in the configuration illustrated in FIG. 13.

Figure 17:
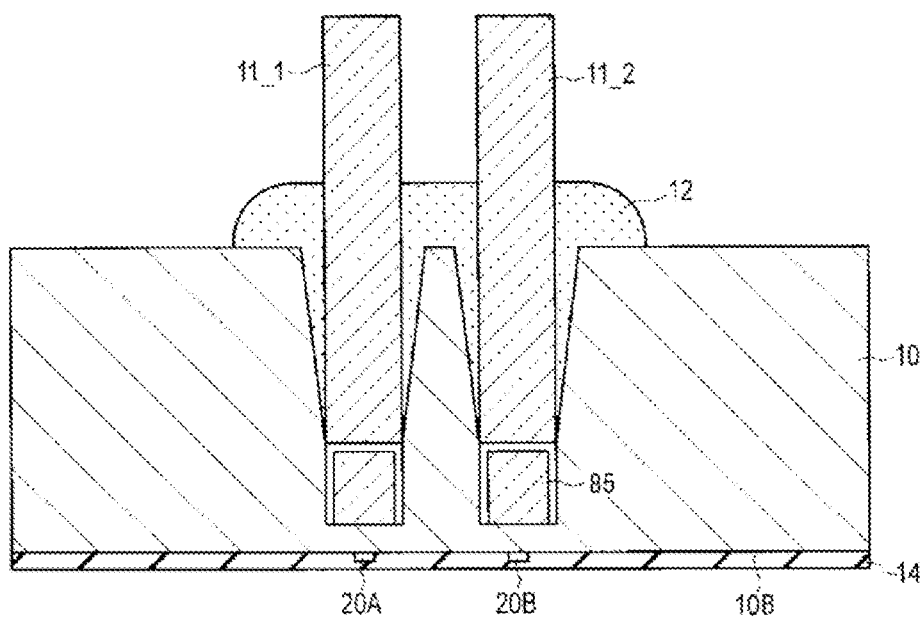
FIG. 17 is a schematic cross-sectional view of a configuration example 5 of the optical semiconductor module according to the third embodiment.

FIG. 17 is a cross-sectional view of the blind via of the optical semiconductor module illustrated in FIG. 1 in the configuration example 5. As illustrated, a coaxial lens, for example, a coaxial refractive index modulation rod lens 85 is disposed between the end portion of each of the optical fibers 11_1 and 11_2 and the bottom surface of the blind via 10V. The coaxial lens 85 can be configured with, for example, silicon or glass.

The optical semiconductor module having the configuration illustrated in FIG. 17 performs the following operations.

The light emitted from the light-emitting element 20A is transmitted through the silicon substrate between the second surface 10B and the bottom surface of the blind via 10V, passes through the coaxial lens 85, and then, is incident on the end portion of the optical fiber 11_1.

In addition, the light emitted from the optical fiber 11_2 passes through the coaxial lens 85, is transmitted through the silicon substrate between the bottom surface of the blind via 10V and the second surface 10B, and then, is incident on the light-receiving element 20B.

Optical Semiconductor Module in Configuration Example 6

This configuration example 6 is an example in which a diffractive optical element, for example, a diffractive lens, a Fresnel's lens, or the like, is disposed on the bottom surface of the blind via 10V in the configuration illustrated in FIG. 13.

Figure 18:
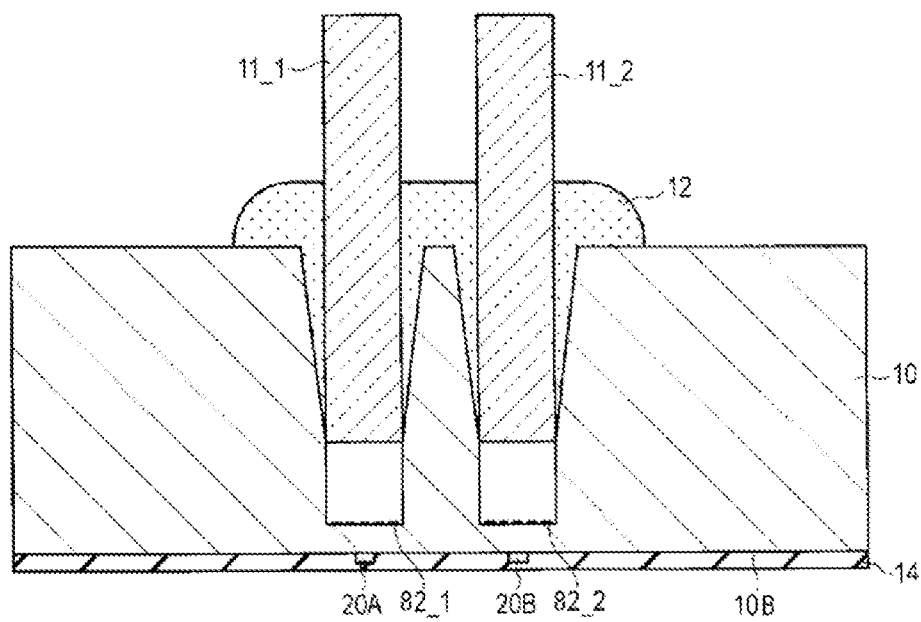
FIG. 18 is a schematic cross-sectional view of a configuration example 6 of the optical semiconductor module according to the third embodiment.

FIG. 18 is a cross-sectional view of the blind via of the optical semiconductor module illustrated in FIG. 1 in the configuration example 6. As illustrated, the diffraction gratings 82_1 and 82_2 are respectively disposed on the bottom surface of the blind via 10V. In addition, air having a function of lens exists between the end portion of the optical fibers 11_1 and 11_2 and the bottom surface of the blind via 10V.

The optical semiconductor module having the configuration illustrated in FIG. 18 performs the following operations.

The light emitted from the light-emitting element 20A is transmitted through the silicon substrate between the second surface 10B and the bottom surface of the blind via 10V, is diffracted by the diffraction grating 82_1, and then, is incident on the end portion of the optical fiber 11_1.

In addition, the light emitted from the optical fiber 11_2 is diffracted by the diffraction grating 82_2, passes through the silicon substrate between the bottom surface of the blind via 10V and the second surface 10B, and then, is incident on the light-receiving element 20B.

Optical Semiconductor Module in Configuration Example 7

This configuration example 7 is an example in which the bottom surface of the blind via 10V has a convex shape in the configuration illustrated in FIG. 13.

Figure 19:
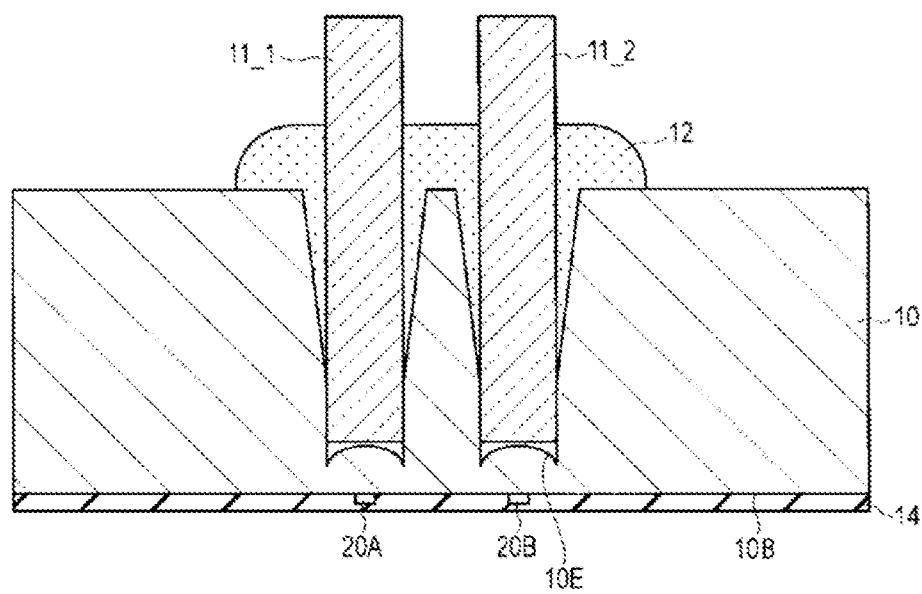
FIG. 19 is a schematic cross-sectional view of a configuration example 7 of the optical semiconductor module according to the third embodiment.

FIG. 19 is a cross-sectional view of the blind via of the optical semiconductor module shown in FIG. 1 in the configuration example 7. As illustrated, the bottom surface of the blind via 10V has a convex shape 10E.

The optical semiconductor module having the configuration illustrated in FIG. 19 performs the following operations.

The light emitted from the light-emitting element 20A is transmitted through the silicon substrate between the second surface 10B and the bottom surface of the blind via 10V, and further, passes through the convex shape 10E of the bottom surface, and then, is incident on the end portion of the optical fiber 11_1.

In addition, the light emitted from the optical fiber 11_2 passes through the convex shape 10E on the bottom surface of the blind via 10V, and is transmitted through the silicon substrate between the bottom surface of the blind via 10V and the second surface 10B, and then, is incident on the light-receiving element 20B.

Optical Semiconductor Module in Configuration Example 8

This configuration example 8 is an example in which the bottom surface of the blind via 10V has a pin shape in the configuration illustrated in FIG. 13.

Figure 20:
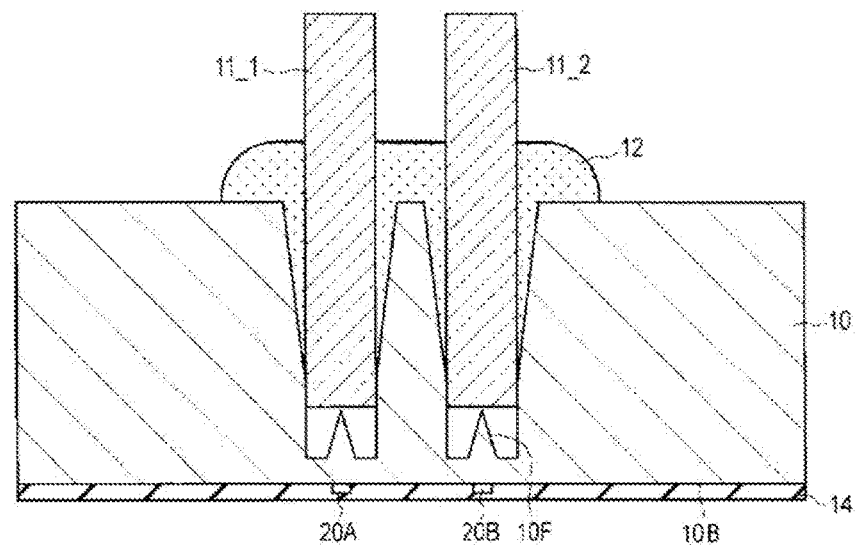
FIG. 20 is a schematic cross-sectional view of a configuration example 8 of the optical semiconductor module according to the third embodiment.

FIG. 20 is a cross-sectional view of the blind via of the optical semiconductor module illustrated in FIG. 1 in the configuration example 8. As illustrated, the bottom surface of the blind via 10V has a pin shape, for example, a cone shape 10F.

The optical semiconductor module having the configuration illustrated in FIG. 20 performs the following operations.

The light emitted from the light-emitting element 20A is transmitted through the silicon substrate between the second surface 10B and the bottom surface of the blind via 10V, and passes through the bottom surface cone shape 10F, and then, is incident on the end portion of the optical fiber 11_1.

In addition, the light emitted from the optical fiber 11_2 passes through the cone shape 10F on the bottom surface of the blind via 10V, and is transmitted through the silicon substrate between the bottom surface of the blind via 10V and the second surface 10B, and then, is incident on the light-receiving element 20B.

Optical Semiconductor Module in Configuration Example 9

This configuration example 9 is an example of having a groove between the adjacent blind vias 10V in the configuration illustrated in FIG. 13.

Figure 21A:
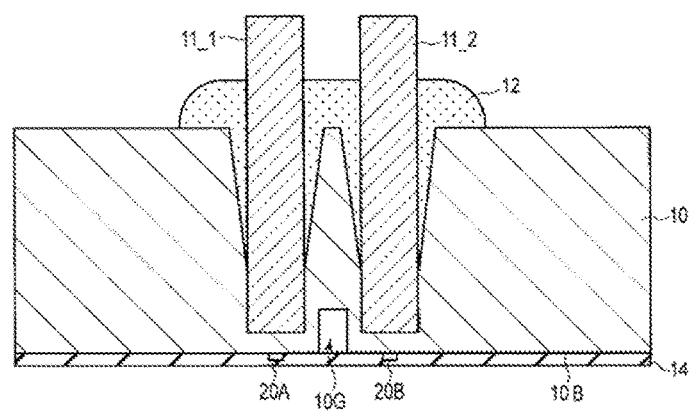
FIGS. 21A and 21B are schematic cross-sectional views of a configuration example 9 of the optical semiconductor module according to the third embodiment.
Figure 21B:
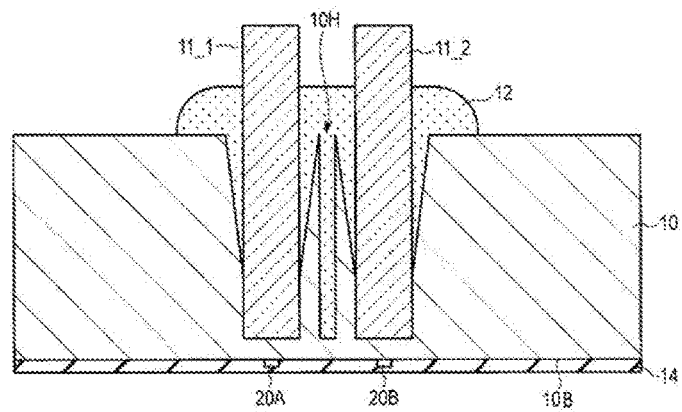

FIGS. 21A and 21B are cross-sectional views of the blind vias of the optical semiconductor module illustrated in FIG. 1 in the configuration example 9.

As illustrated in FIG. 21A, a groove 10G which is formed from the second surface 10B side of the silicon substrate 10 is formed between the blind vias 10V, in other words, between the optical fibers 11_1 and 11_2. That is, the silicon substrate 10 includes the groove 10G on the second surface 10B between the optical fibers 11_1 and 11_2.

As illustrated in FIG. 21B, a groove 10H which is formed from the first surface 10A side of the silicon substrate 10 is formed between the blind vias 10V, in other words, between the optical fibers 11_1 and 11_2. That is, the silicon substrate 10 includes a groove 10H on the first surface 10A between the optical fibers 11_1 and 11_2.

These grooves 10G and 10H have a function of shielding scattered light generated at the end portion of each optical fiber or the bottom surface of the blind via.

In this example, similarly to the configuration illustrated in FIG. 13, the light can be transmitted and received between the optical fiber 11_1 and the light-emitting element 20A and between the optical fiber 11_1 and the light-receiving element 20B, and furthermore, it is possible to reduce scattered light generated at the end portion of each optical fiber or the bottom surface of blind via.

Optical Semiconductor Module in Configuration Example 10

This configuration example 10 is an example in which a resin that absorbs light is further formed on the transparent resin to which the optical fiber is fixed in the configuration shown in FIG. 13.

Figure 22:
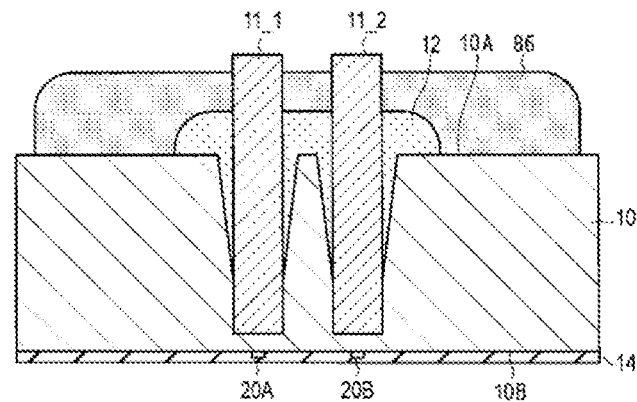
FIG. 22 is a schematic cross-sectional view of a configuration example 10 of the optical semiconductor module according to the third embodiment.

FIG. 22 is a cross-sectional view of a blind via in the configuration example 10 of the optical semiconductor module shown in FIG. 1.

As illustrated in FIG. 22, the light absorption resin 86 is disposed only on the first surface 10A around the blind via 10V on which the optical fibers 11_1 and 11_2 are fixed.

This light absorption resin 86 is non-transparent with respect to the emission wavelength of the light-emitting element 20A, and absorbs the scattered light generated at the bottom surface or the like of each blind via at the surface or side surface thereof. In this way, a crosstalk, such as stray light, or the like, to an optical fiber or an optical element in another blind via can be prevented. That is, the scattered light generated at the bottom surface of the blind via or the like is removed.

Optical Semiconductor Module in Configuration Example 11

Figure 23:
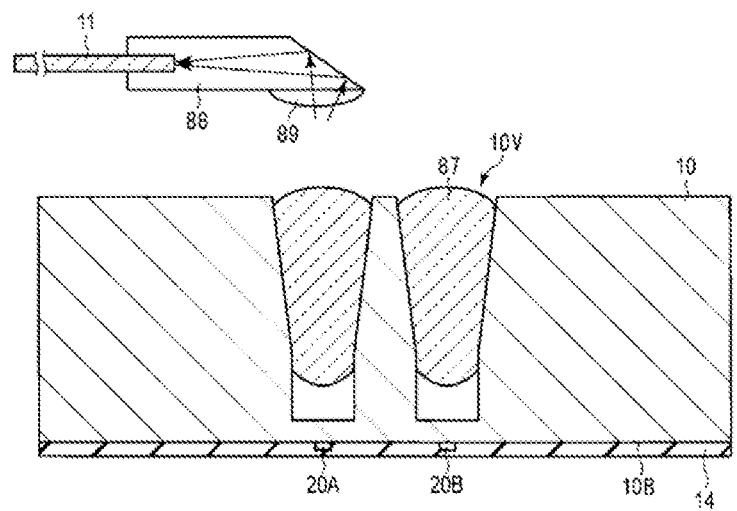
FIG. 23 is a schematic cross-sectional view of a configuration example 11 of the optical semiconductor module according to the third embodiment.

FIG. 23 is a cross-sectional view of a blind via in the optical semiconductor module in the modification example.

In this modification example, a resin lens 87 is disposed in the blind via 10V. Furthermore, a lens molded component or a holder 88 to which the optical fiber 11 is fixed is disposed at the top of the blind via 10V. The lens molded component 88 includes a lens 89 and the lens 89 is disposed on the optical axis of the resin lens 87 (and the light-emitting element 20A or the light-receiving element 20B). Furthermore, the light-emitting element 20A and the light-receiving element 20B are disposed on the second surface of the silicon substrate 10 and on the optical axis of the resin lens 87 respectively. The transmission and reception of the light between the light-emitting element 20A or the light-receiving element 20B and the optical fiber 11 are performed via the resin lens 87 and the lens 89 of the lens molded component.

Furthermore, various other configuration examples of the optical semiconductor module will be described below.

Figure 24:
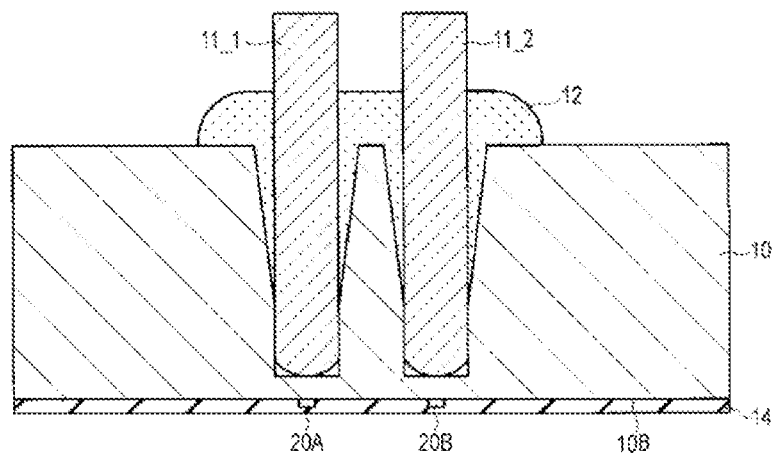
FIG. 24 is a schematic cross-sectional view of another configuration example of the optical semiconductor module according to the third embodiment.
Figure 25:
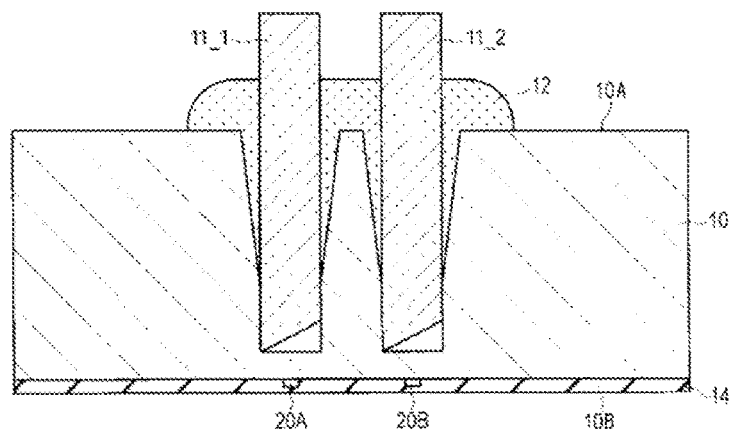
FIG. 25 is a schematic cross-sectional view of another configuration example of the optical semiconductor module according to the third embodiment.
Figure 26:
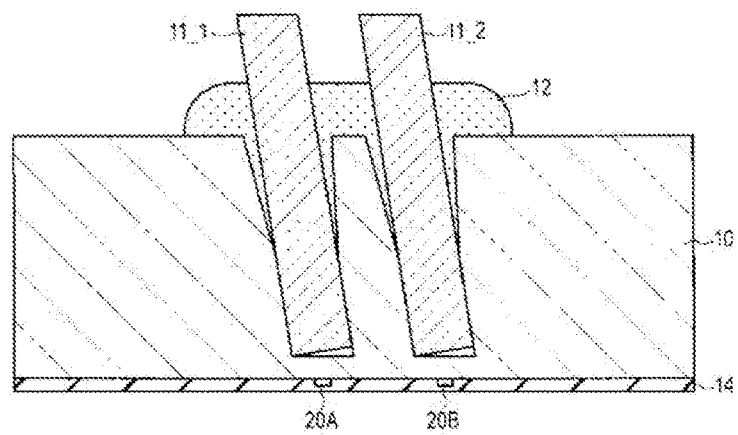
FIG. 26 is a schematic cross-sectional view of another configuration example of the optical semiconductor module according to the third embodiment.
Figure 27A:
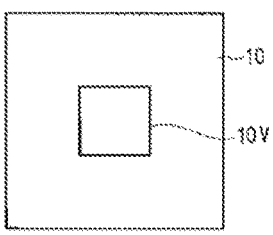
FIGS. 27A, 27B, 27C, and 27D are schematic cross-sectional views of a configuration example of an aperture of a blind via of the optical semiconductor module according to the third embodiment.
Figure 27B:
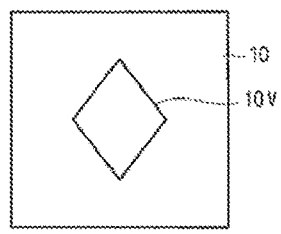
Figure 27C:
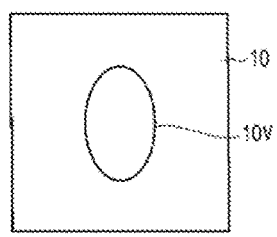
Figure 27D:
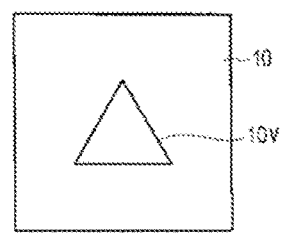

FIGS. 24, 25 and 26 are cross-sectional views of the blind vias in the optical semiconductor module illustrated in FIG. 1.

As illustrated in FIG. 24, the tips of the optical fibers 11_1 and 11_2 are processed into spherical shapes. That is, the tips of the optical fibers 11_1 and 11_2 inserted into the blind via 10V are spherically shaped. In this way, the optical coupling between the optical fiber and the light-emitting element 20A or the light-receiving element 20B can be improved, and it is possible to reduce the reflection light returned to the light-emitting element, for example, in a case where the light is received from the light-emitting element 20A.

In addition, as illustrated in FIG. 25, the tips of the optical fibers 11_1 and 11_2 are processed obliquely. That is, the tips of the optical fibers 11_1 and 11_2 inserted into the blind via 10V have oblique shapes with respect to the first surface 10A or the second surface 10B. In this way, it is possible to prevent the reflection light returned to the light-emitting element in a case where the light is received from the light-emitting element 20A. For example, it is possible to prevent an externally induced noise due to the returned reflection light, which is a problem in a case where the light-emitting element 20A is a semiconductor laser.

In addition, as illustrated in FIG. 26, the tips of the optical fibers 11_1 and 11_2 have surfaces parallel to the first surface 10A or the second surface 10B, and the blind via 10V is oblique to the first surface 10A. That is, the depth direction of the blind via 10V (i.e., the insertion direction of the optical fibers 11_1 and 11_2) is not perpendicular to the first surface 10A but is oblique. Here, "oblique" means that the angle formed by the first surface 10A or the second surface 10B and the depth direction or the direction of the optical fiber of the blind via 10V has an angle smaller than 90 degrees.

In this way, it is possible to prevent the reflection light returned to the light-emitting element in a case where the light is received from the light-emitting element 20A, and for example, it is possible to prevent an externally induced noise due to the returned reflection light, which is a problem in a case where the light-emitting element 20A is a semiconductor laser. The tip of the optical fiber is not limited to parallel surfaces, and it may be processed so as to be other than vertical, such as spherical processing, oblique processing.

Configuration Example of Aperture of Blind Via

FIGS. 27A to 27D are diagrams illustrating opening shapes seen from the upper surface of the blind via 10V.

The opening shapes of blind via 10V do not necessarily have to match the circular cross section of the optical fiber 11, but may have a square, a rhombus, an ellipse, a triangle, or the like having regions not in contact with the side surface of the optical fiber 11 as illustrated in FIGS. 27A to 27D.

As described above, if the opening shapes of the blind via 10V have an area that is not in contact with the side surface of the optical fiber 11, since a gap is formed, which is for removing the excessive transparent resin 12 and bubbles at the time of inserting the optical fiber 11, the insertion and assembly of the optical fiber becomes easy.

According to the present embodiments, the optical coupling between the optical fiber and the optical element can be simplified and an optical device capable of being miniaturized and cost reduction can be used. Therefore, it is possible to provide an optical semiconductor module capable of being miniaturized and cost reduction by combining the present embodiment with the first to third embodiments.

The position alignment of the optical fiber and the optical element can be performed with high accuracy by using the optical device using the blind via as the optical device without the need for to a separate holder to support an optical fiber, and thus, it is possible to realize the optical coupling between the optical fiber and the optical element with a simple and compact configuration.

In addition, the semiconductor substrate has the function of fixing the optical fiber and fixing the optical element on the optical axis of the optical fiber. Furthermore, an optical element configured with a compound semiconductor is formed on the second surface of the silicon substrate, or an optical element is directly formed on the second surface of the semiconductor substrate, therefore, it becomes possible to manufacture a large quantity on a wafer and also quality control becomes easy, and thus, the cost reduction can be achieved.

The optical semiconductor module is used in the field of optical transmission technology such as optical communication, and optical wiring in the field of an optical recording technology such as pickup for an optical disk, and furthermore, in the fields of an optical information processing technology and an optical measurement technology. The optical semiconductor modules according to the embodiments described above include a module in which the optical semiconductor element itself such as the light-emitting element and the light-receiving element is packaged, or a module in which an optical element drive device is further included, and a module configured with an integrated element in which the optical element drive device and the optical semiconductor elements are integrated. In addition, as light transmission media, space, optical fiber, an optical waveguide, and the like can be appropriately selected depending on the field of application.

In addition, in the embodiments described above, the optical semiconductor module for the optical fiber transmission is used an example for the description. However, the optical semiconductor module is not limited to this example, and can be applied to other uses and types described above without departing from the gist thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical semiconductor module, comprising:
    a resin body having a first surface and a second surface opposite the first surface;
    an optical device having a third surface and a fourth surface opposite the third surface, the optical device comprising an optical element located at the fourth surface, the optical element capable of at least one of receiving light from, and transmitting light through, the third surface;
    a first terminal located at the first surface of the resin body; and
    an electrical connection between the first terminal and the optical device, the electrical connection embedded in the resin body, wherein
    the third surface of the optical device and the first surface of the resin body are in substantially the same plane.

2. The optical semiconductor module of claim 1, wherein the resin body includes a first recess extending inwardly of the first surface thereof and terminating at a base between the first surface and second surface of the resin body, and the optical device in the first recess.

3. The optical semiconductor module of claim 2, further comprising a second recess extending inwardly of the third surface and terminating within the optical device, the second recess aligned with the location of the optical element.

4. The optical semiconductor module according to claim 3, further comprising an optical fiber in the second recess.

5. The optical semiconductor module according to claim 4, further comprising a resin sealant in the second recess and around the optical fiber.

6. The optical semiconductor module according to claim 4, further comprising a lens located between the optical fiber and the optical element.

7. The optical semiconductor module according to claim 2, further comprising an insulating layer between the base of the first recess and the fourth surface of the optical device.

8. The optical semiconductor module according to claim 1, wherein the first surface of the resin body and a surface of the first terminal are coplanar.

9. The optical semiconductor module of claim 8, wherein the resin body further comprises opposed sides extending between the first surface side and the second surface side thereof, and the first surface of the resin body includes a third recess extending therein adjacent to a side of the resin body, and
    the first terminal is located in the third recess.

10. The optical semiconductor module according to claim 1, wherein the electrical connection is a wire.

11. The optical semiconductor module according to claim 1, wherein the electrical connection is inside the resin body and directly contacting the resin body.

12. The optical semiconductor module according to claim 1, wherein the optical device further comprises:
    a semiconductor substrate having a first main surface and a second main surface opposite the first main surface, the optical element being directly on the second main surface;
    a via extending partway in a thickness direction of the semiconductor substrate from the first main surface towards the second main surface, the via being aligned with the optical element; and
    an electrode on the second main surface, wherein the optical element is made of a compound semiconductor.

13. The optical semiconductor module according to claim 12, the semiconductor substrate is silicon substrate.

14. A semiconductor device, comprising:
a resin body having a first surface and a second surface opposite the first surface;
an optical device having a third surface and a fourth surface opposite the third surface, the optical device comprising an optical element located at the fourth surface, the optical element capable of at least one of receiving light from, and transmitting light through, the third surface;
a first terminal located at the first surface side of the resin body; and
an optical element drive between the first terminal and the optical device, wherein
a first electrical connection extends between the first terminal and the optical element drive, and a second electrical connection extends between the optical device and the optical element drive, and the first and second electrical connections are embedded in the resin body, wherein
the third surface of the optical device and the first surface of the resin body are in substantially the same plane.

15. The semiconductor device of claim 14, wherein the resin body includes a first recess extending inwardly of the first surface side thereof and terminating at a base between the first surface side and second surfaces side of the resin body, and the optical device extends inwardly of the first recess.

16. The semiconductor device of claim 15, further comprising a second recess extending inwardly of the third surface and terminating within the optical device, the second recess aligned with the location of the optical element.

17. The semiconductor device according to claim 16, further comprising a third recess extending inwardly of the first surface of the resin body and terminating between the first surface and second surface of the resin body, wherein the optical element drive is located in the third recess.

18. The semiconductor device according to claim 16, further comprising an optical fiber in the second recess, and a resin sealant in the second recess around the optical fiber.

19. The semiconductor device according to claim 18, further comprising a lens located between the optical fiber and the optical element.

20. The semiconductor device according to claim 15, further comprising an insulating layer between the base of the first recess and the fourth surface of the optical device.

21. The semiconductor device according to claim 14, wherein the first surface of the resin body and an upper surface of the first terminal are coplanar.

22. The semiconductor device of claim 21, wherein
the resin body further comprises opposed sides extending between the first surface side and the second surface side thereof, and the first surface of the resin body includes a fourth recess extending therein adjacent to a side of the resin body, and
the first terminal is located in the fourth recess.

23. The semiconductor device according to claim 14, wherein each of the first and second electrical connections is a wire.

24. The semiconductor device according to claim 14, wherein each of the first and second electrical connections are inside of the resin body and directly contacting the resin body.

25. The semiconductor device according to claim 14, wherein the optical device further comprises:
a semiconductor substrate having a first main surface and a second main surface opposite the first main surface, the optical element being directly on the second main surface;
a via extending partway in a thickness direction of the semiconductor substrate from the first main surface towards the second main surface, the via being aligned with the optical element; and
an electrode on the second main surface, wherein
the optical element is made of a compound semiconductor.

26. The semiconductor device according to claim 25, the semiconductor substrate is silicon substrate.

* * * * *